(12) United States Patent
Auletta et al.

(10) Patent No.: US 7,955,458 B2
(45) Date of Patent: Jun. 7, 2011

(54) STAGING SYSTEM FOR AUTOMATED WINDOW OR DOOR FABRICATION

(75) Inventors: Ronald A. Auletta, Broadview Hts., OH (US); John Grismer, Cuyahoga Falls, OH (US); Timothy B. McGlinchy, Twinsburg, OH (US)

(73) Assignee: GED Integrated Solutions, Inc., Twinsburg, OH (US)

( * ) Notice: Subject to any disclaimer, the term of this patent is extended or adjusted under 35 U.S.C. 154(b) by 626 days.

(21) Appl. No.: 11/775,957

(22) Filed: Jul. 11, 2007

(65) Prior Publication Data
US 2008/0066854 A1   Mar. 20, 2008

Related U.S. Application Data

(60) Provisional application No. 60/830,188, filed on Jul. 12, 2006.

(51) Int. Cl.
*B32B 37/00* (2006.01)
(52) U.S. Cl. ...... 156/73.5; 156/92; 156/281; 156/304.2; 156/304.6; 156/308.2
(58) Field of Classification Search ............... 156/73.1, 156/73.5, 73.6, 304.1, 304.2, 304.5, 304.6, 156/308.2, 309.9, 322, 499, 580, 583.1, 91, 156/92, 281
See application file for complete search history.

(56) References Cited

U.S. PATENT DOCUMENTS

| | | | |
|---|---|---|---|
| 5,276,957 A * | 1/1994 | Murphy et al. | ............ 29/430 |
| 5,660,670 A | 8/1997 | Sturz | |
| 5,753,065 A | 5/1998 | Buzzelli | |
| 6,086,703 A | 7/2000 | Sturtz et al. | |
| 6,294,044 B1 | 9/2001 | Schwaiger et al. | |
| 7,096,913 B2 | 8/2006 | Ramnauth et al. | |
| 2004/0099372 A1 | 5/2004 | Ramnauth et al. | |
| 2005/0241130 A1 | 11/2005 | Ramnauth et al. | |
| 2005/0257361 A1 | 11/2005 | Ramnauth et al. | |

FOREIGN PATENT DOCUMENTS

EP   0678374   4/1995
EP   0925868   6/1999

* cited by examiner

*Primary Examiner* — James Sells
(74) *Attorney, Agent, or Firm* — Tarolli, Sundheim, Covell & Tummino LLP

(57) ABSTRACT

A system that delivers window or door components to an assembly station where multiple components are assembled to form a multi-sided window or door frame or sash. A preparation station in proximity to the assembly station includes an alignment fixture for bringing multiple frame or sash components into alignment while a preceding frame or sash is being assembled at the assembly station. A conveyor moves aligned components of a next subsequent frame or sash to the assembly station while maintaining the alignment of said window components for clamping at the assembly station prior to assembly. One system is used to assemble vinyl door or window components by welding them together.

15 Claims, 21 Drawing Sheets

STAGING SYSTEM FOR AUTOMATED WINDOW OR DOOR FABRICATION

CROSS REFERENCE TO RELATED APPLICATIONS

The present application claims priority from U.S. Provisional Application Ser. No. 60/830,188 filed Jul. 12, 2006 which is incorporated herein by reference.

FIELD OF THE INVENTION

The present invention concerns staging, loading, transporting and unloading areas used to make, fabricate and/or assembly of a window/door frame and/or sash more efficient.

BACKGROUND

GED Integrated Solutions, assignee of the present invention sells welding machines that are used in the fabrication of residential and commercial windows and doors. These welding machines weld frame and/or sash components together into an assembled product. GED model numbers SW7000 and SW6000 Four Point Welders have a capability of producing several layers of window frames and sashes simultaneously in a single, stacked configuration. These welders can also be equipped with frame/sash ejection options that speed up the unloading of the assembled frames in with an automated method.

These welders can further be automated and integrated into a conveyor for offloading and transporting assembled frames or sashes to an automated cleaner. This reduces the time and labor to transport to a cleaning station. For vinyl products the cleaning station removes PVC flash and burrs that are created during a welding/fusing process.

A manual prior art system presently in use with these two four point welders can take several seconds (about 40 to 80 seconds) to load a multi-tiered stacked configuration. While the welder is being loaded, it is not welding any product and is therefore not being fully utilized to produce product.

SUMMARY OF THE INVENTION

An exemplary system delivers window or door components to an assembly station where multiple components are assembled to form a multi-sided window or door frame or sash. A preparation or staging station in proximity to an assembly station includes an alignment fixture for bringing multiple frame or sash components into alignment while a preceding frame or sash is being assembled at the assembly station.

A conveyor moves aligned components of a next subsequent frame and/or sash to the assembly station while maintaining the alignment of said window components for clamping at the assembly station prior to assembly.

In one exemplary embodiment, the preparation station includes a load assembly that configures vinyl components in an arrangement approximating the configuration they occupy when they are loaded into a welder. While a next subsequent set of components is being aligned at the staging area, one or more previously aligned frames or sashes are heated, fused, cooled and then ejected.

The exemplary system permits an operator to load product in a staging area prior to welding, and have the product automatically index into the welding and ejection station. This will allow the weld station to be more fully utilized during production. Since the operator does not have to wait for the weld cycle to complete before staging the next set of frame or sash components, a throughput of the welding machine is substantially increased.

These and other features of the invention are more fully described in conjunction with the accompanying drawings.

EXEMPLARY EMBODIMENT FOR PRACTICING THE INVENTION

Figure 1:
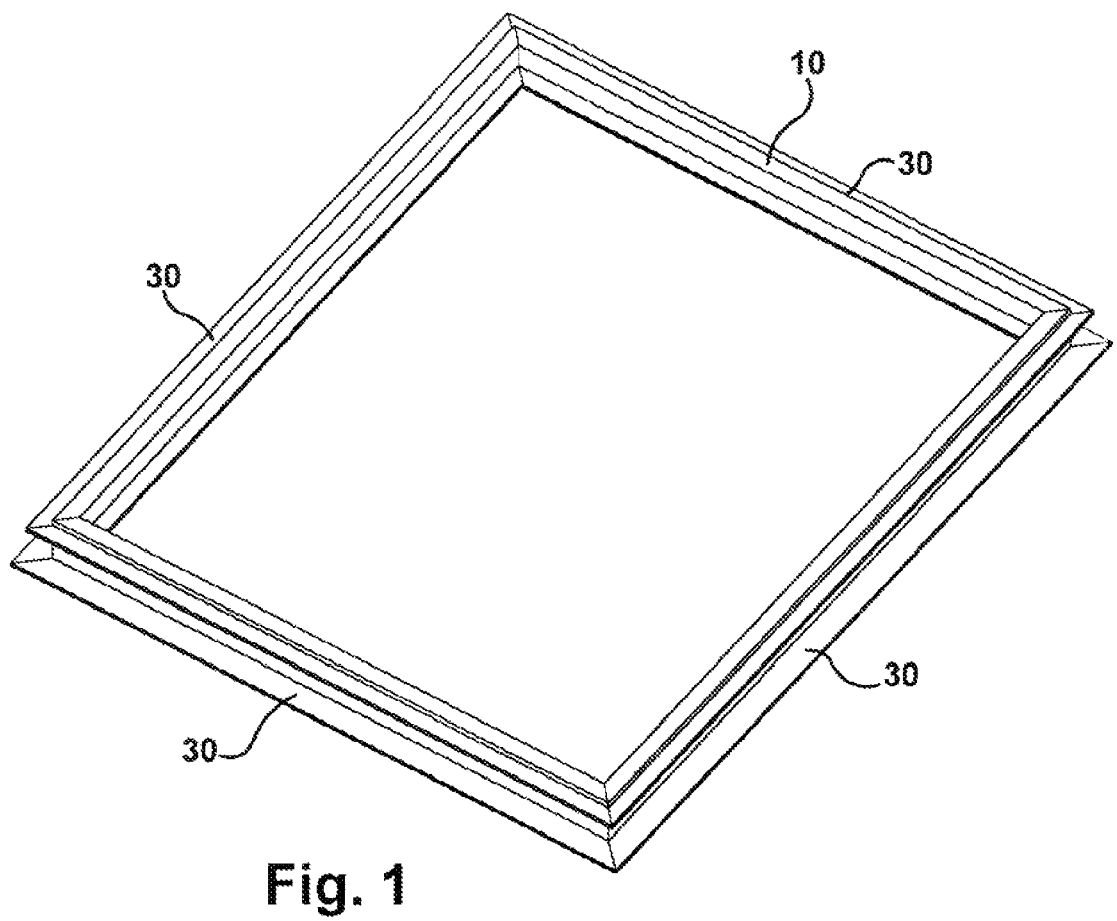
FIG. 1 is a schematic perspective view of a window frame placed on a conveyor subsequent to assembly of components that make up the window frame.

The figures illustrate alternate configurations for practicing the invention. One goal of the invention is to make efficient use of the an assembly station, which in one illustrated embodiment is a vinyl welding station 100, where window or door frame 10 (FIG. 1) or sash components are fused together to form a completed frame or sash that is automatically ejected form the assembly station and moved to a cleaning station.

FIGS. 2-7 illustrate process steps performed while practicing the invention.

Figure 2:
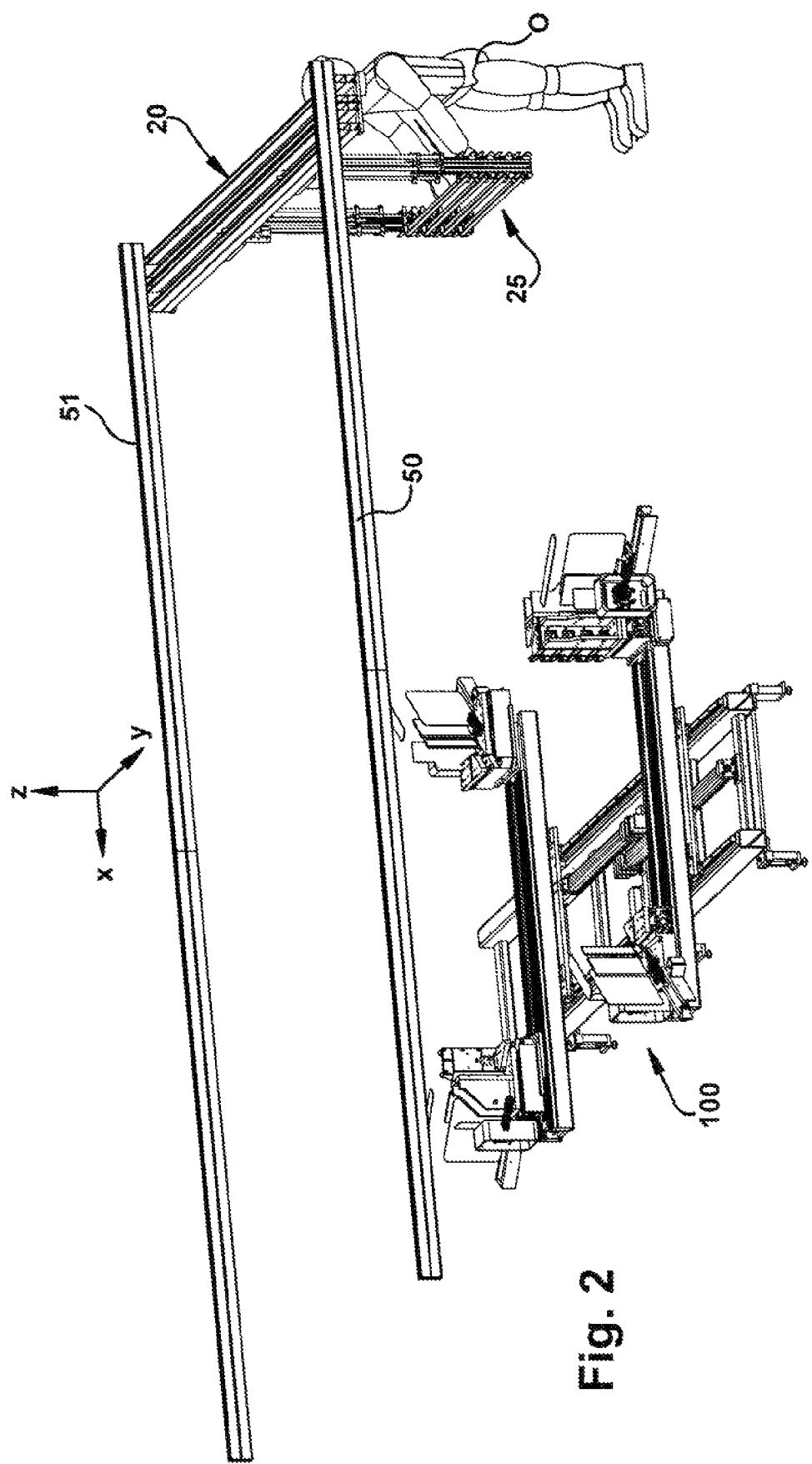
FIGS. 2-7 are schematic depictions of a sequence of steps performed during practice of the invention.

Step 1 (FIG. 2)

A load assembly made up of four component support trees 24 (See FIG. 8 for detail of the trees) suspended from an overhead gantry is moved to a load or staging area 25 spaced from the weld station 100. At the load position, the assembly is lowered to a height in the z direction so that an operator O working at the load position can conveniently load components that make up a frame within that operator's "ergonomic comfort zone."

The operator begins to load components 30 into the trees which have clamps for clamping frame or sash components at multiple levels 35a-35d of the four support trees 24. Each of the trees that make up the assembly are attached to the gantry by a vertically oriented support arm 40. While the disclosed embodiment defines four levels, use of other number of levels is certainly possible.

Loading of frame or sash components into the assembly is performed stalling in the back or side (the frame is referred to as having a front; two sides and a back) in order to allow for easy access by the operator to a region between the vertical trees when large frame/sash assemblies are being staged.

Figure 3:
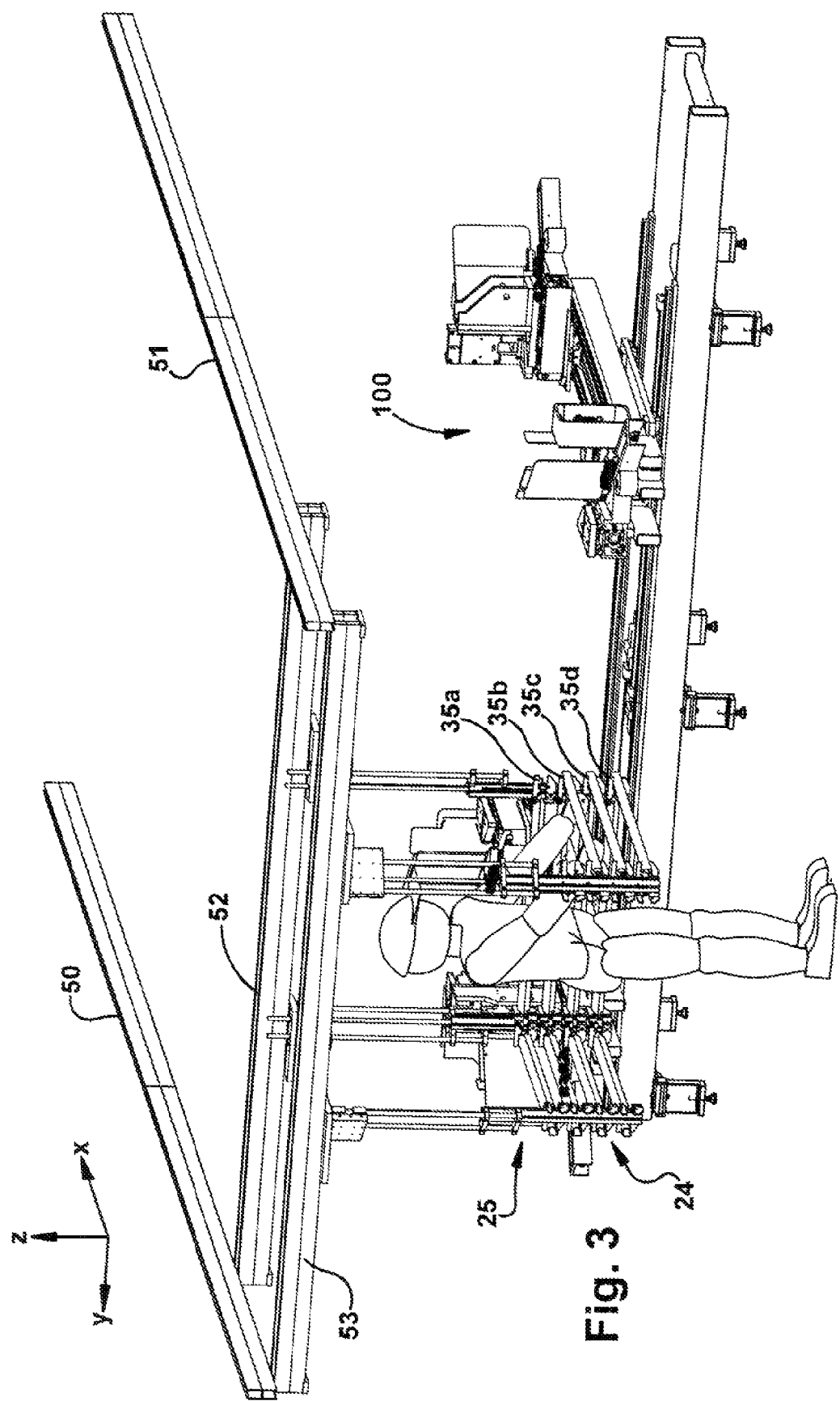

Step 2 (FIG. 3)

The operator continues to load the trees 24 with sash and/or frame components. The operator is prompted with position information for each component by a computer display (not shown) that is visible to the operator at the staging area. As depicted in FIG. 3, typically the side components are loaded after the back. The components do not touch each other here; rather they have a gap at the mitered corners so that they can be loaded into the weld fixtures which are already spaced apart at the time of loading the components 30.

Figure 4:
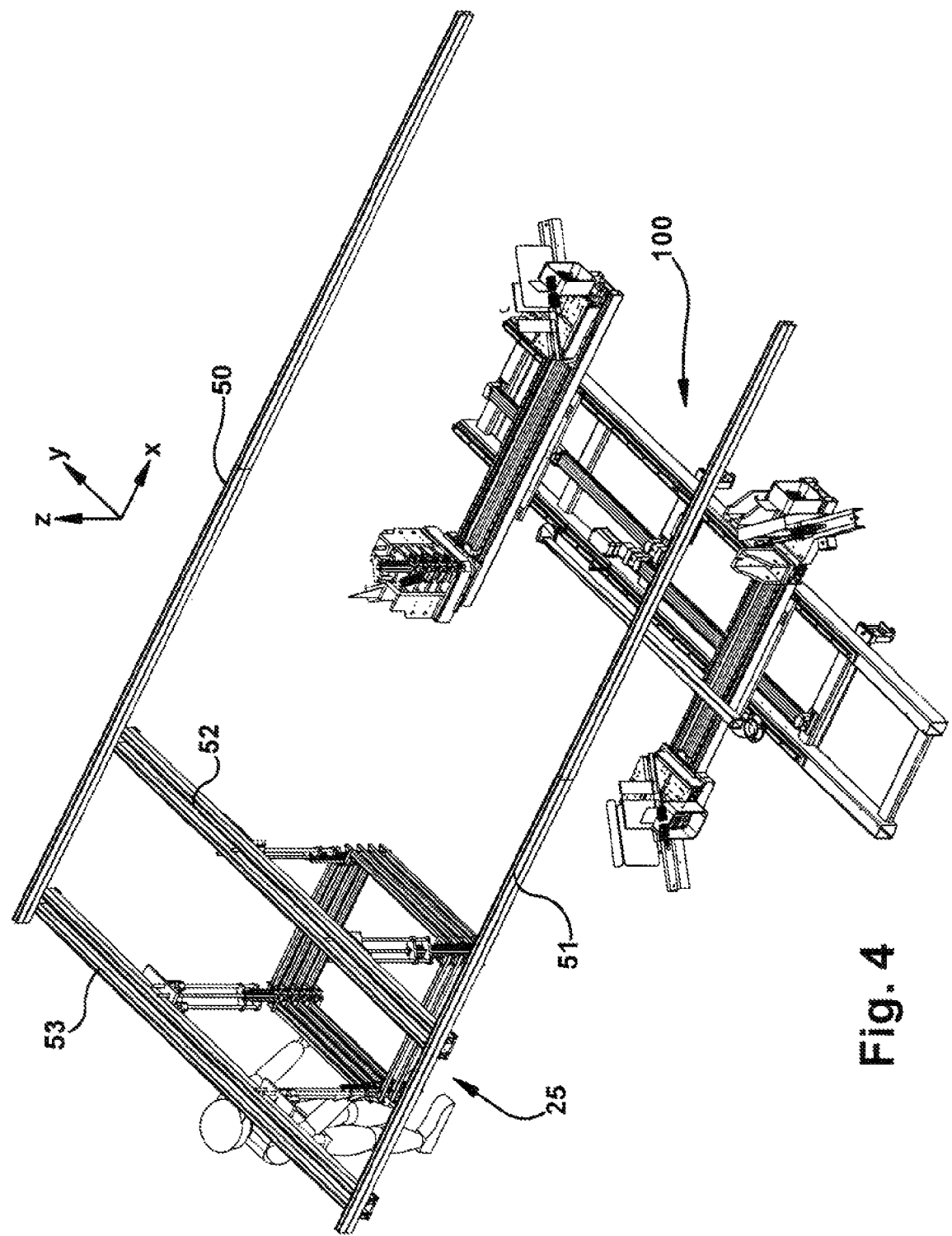

Step 3 (FIG. 4)

The operator O has loaded a front of the assembly at the staging area 25. Once this stage of the process has been completed, a completion signal is initiated from the operator by pressing a control button or the like on a console such as a touch screen console.

Figure 5:
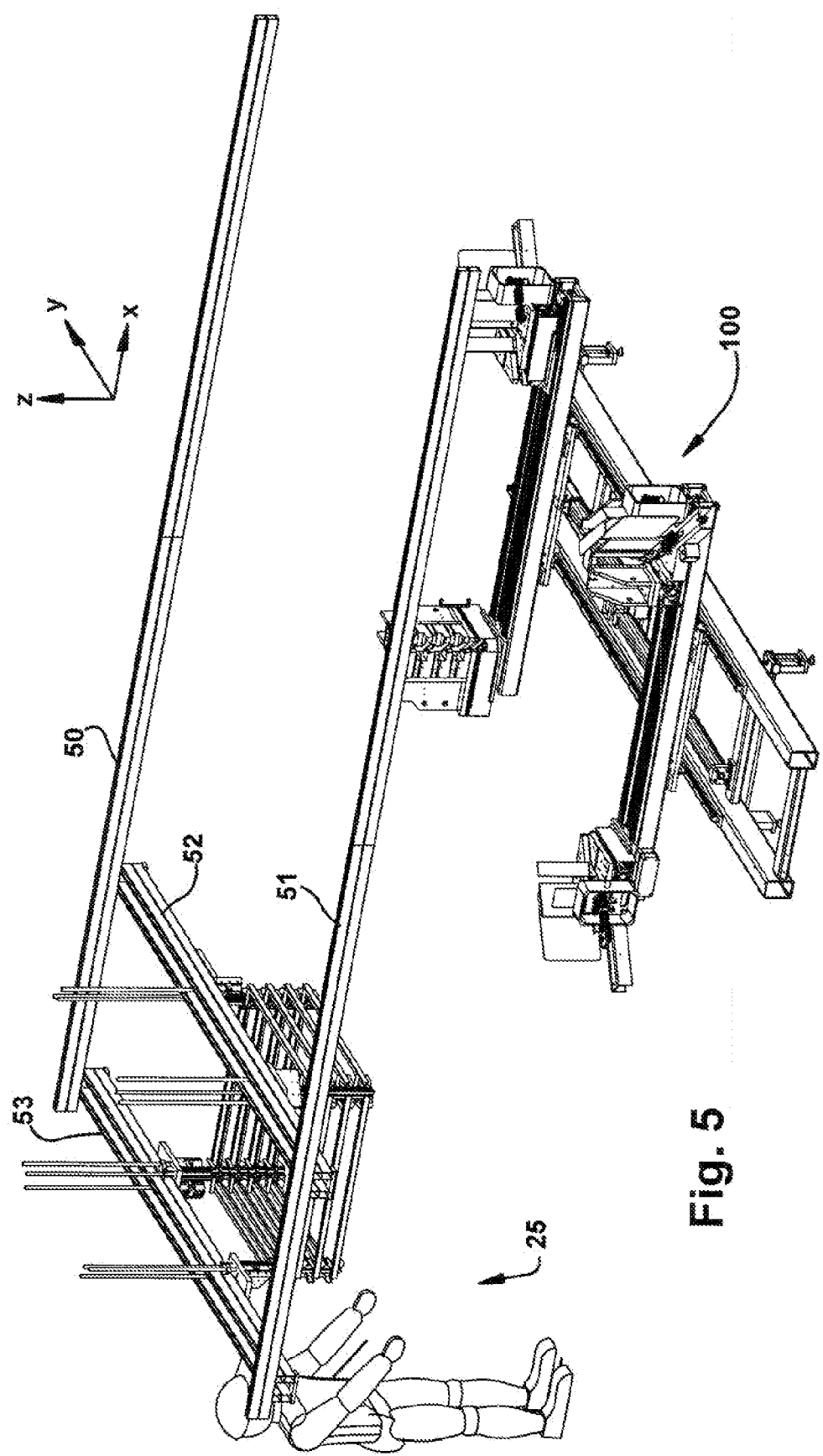
Figure 6:
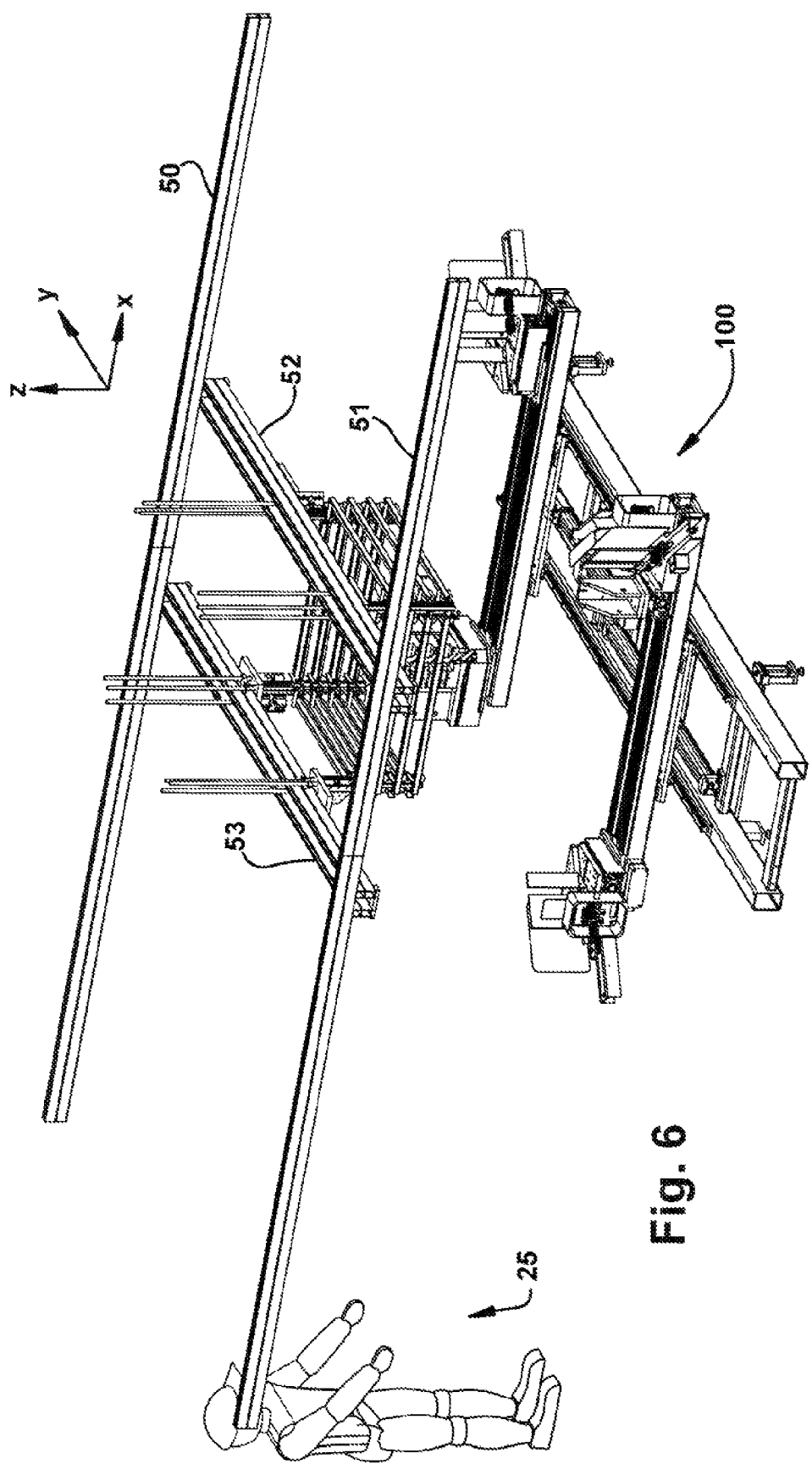

Step 4 (FIGS. 5 and 6)

An assembled stack of lineal vinyl components is raised (+z direction in drawings) and transported to the welder station 100 on the gantry. The gantry is seen to include two cross members 52, 53 supported, on beams 50, 51. Each of the cross members support two arms of the trees 24 and are moved in the y direction defined in the figures due to actuation of a suitable drive such as a AC brushless servo motor system. In one embodiment, the drive for the z direction is a ball screw drive and in the x-y plane the drive is a rack and pinion.

Figure 7:
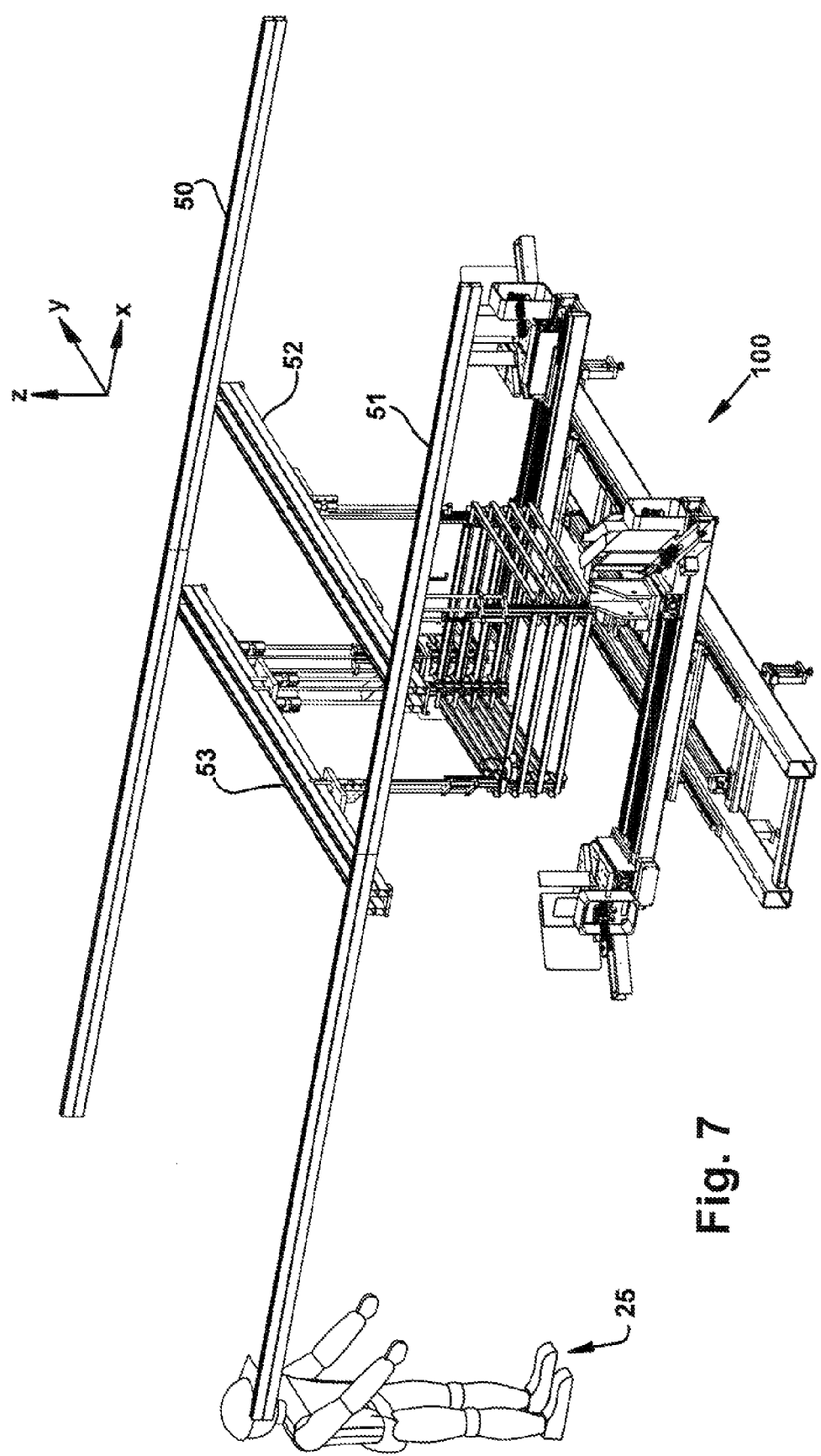

Step 5 (FIG. 7)

Once the stack is positioned to the center of the welder, movable welding heads supported by a welder x-y gantry are moved towards the trees, and the clamped, properly aligned components supported by those trees. The weld head components include clamps that are in an un-clamped or open position to transfer the components 30 from the trees 24 to the weld fixtures.

At corners of the weld fixtures, the weld station clamps are closed to secure the components in spaced apart relation for insertion of a vertically oriented heating plate between adjacent frame components. The tree clamps on the load assembly are unclamped, lowered (for transfer of the components to the weld fixture, retracted towards the center, and moved vertically out of the way in order to clear the welder for movement back to the load area 25.

Figure 8:
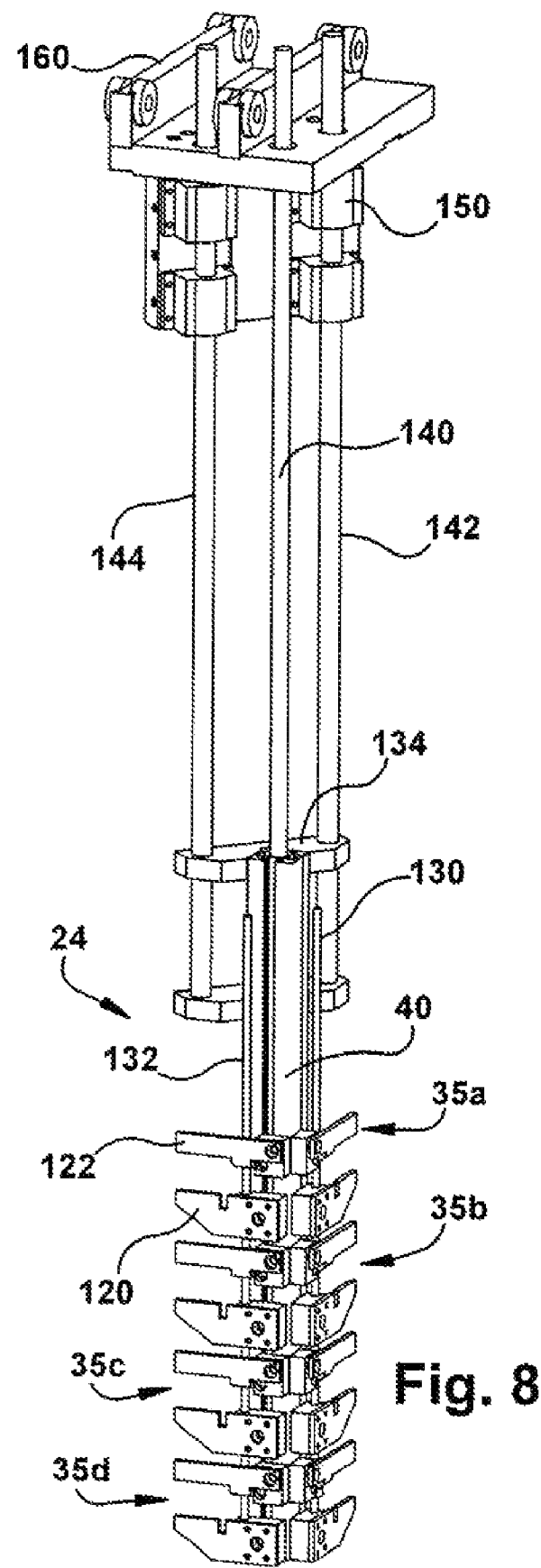
FIG. 8 is an enlarged perspective view of a component support tree.
Figure 9:
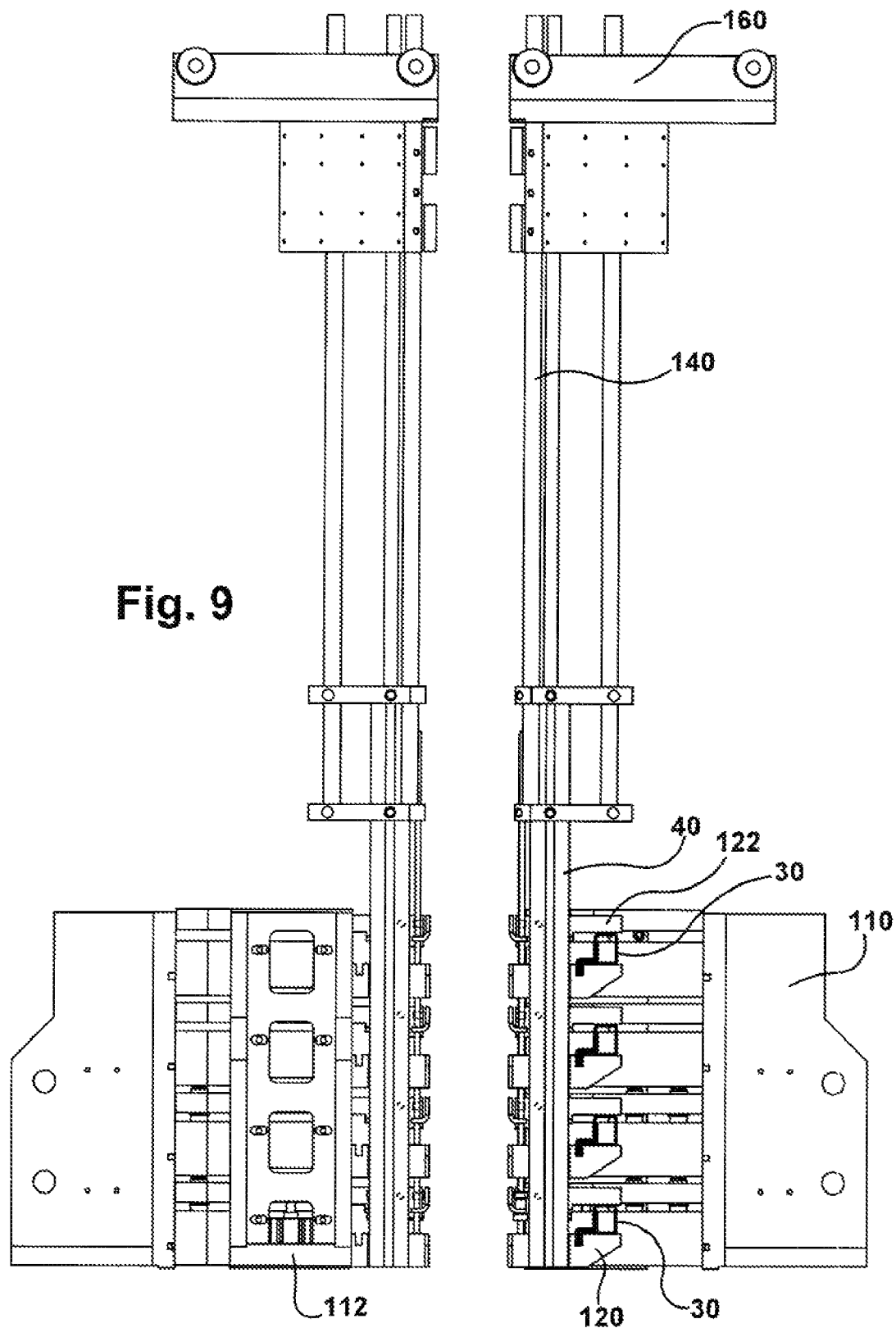
FIG. 9 are front and rear elevation view of a component support tree.
Figure 10:
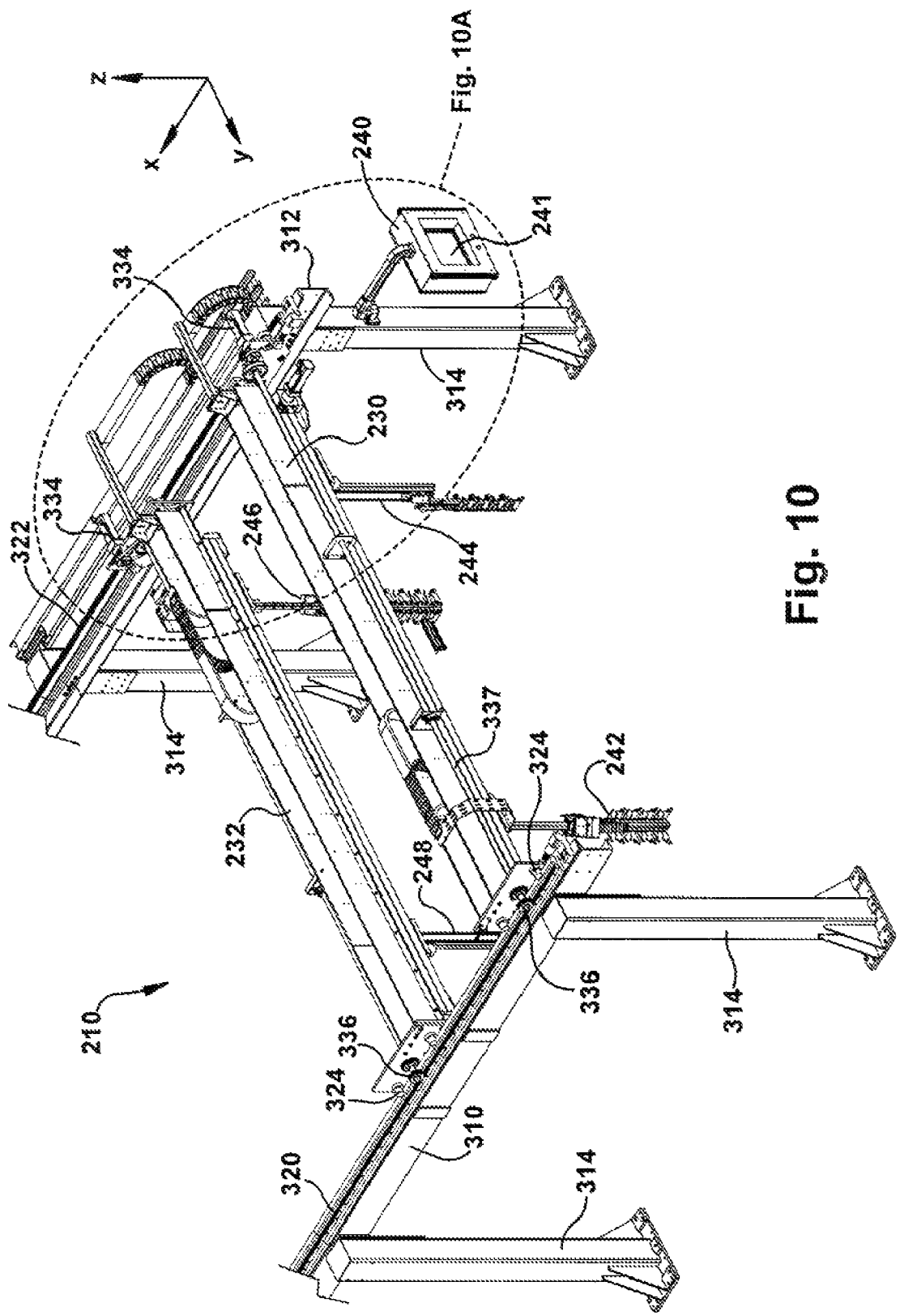
FIGS. 10 and 11 are perspective views of an alternate set up station.
Figure 11A:
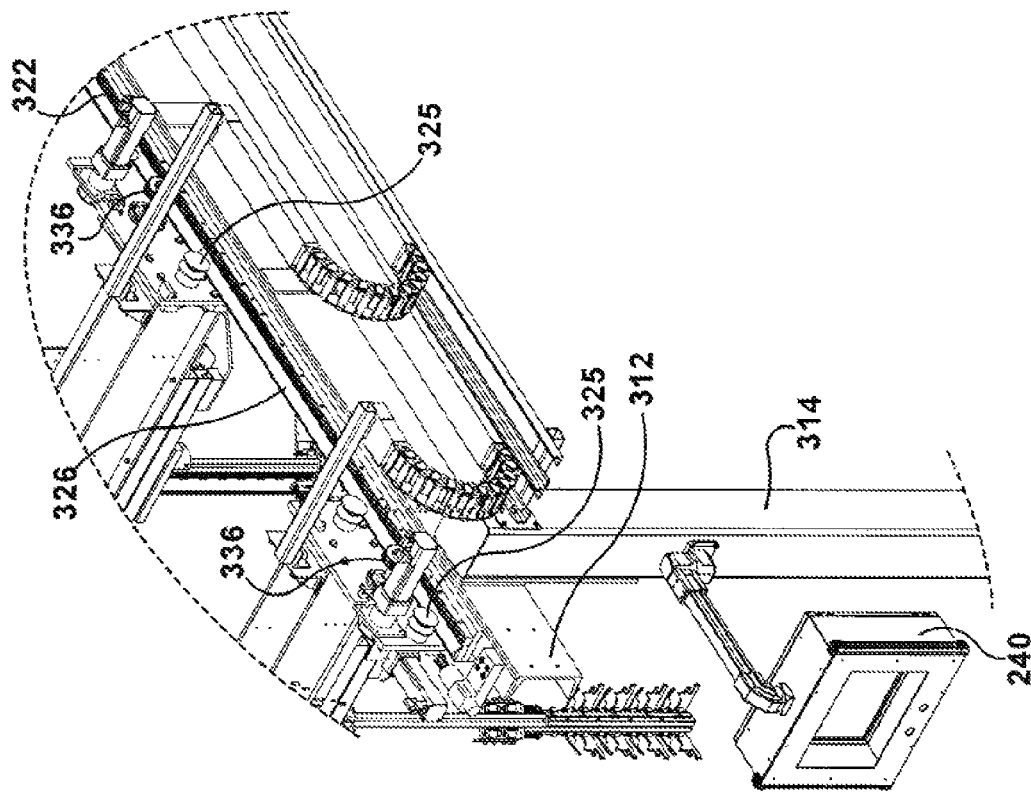
FIGS. 10A and 11A are enlarged perspective views depicting regions 10A and 11A of FIGS. 10 and 11 respectively.
Figure 10A:
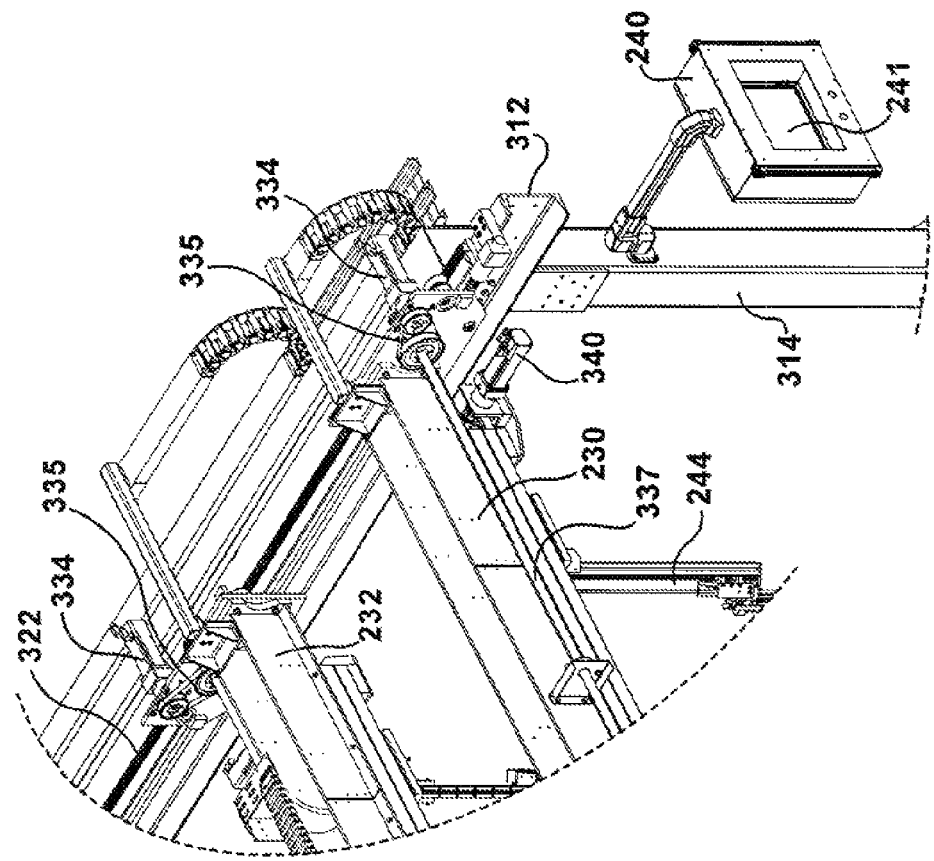
Figure 11:
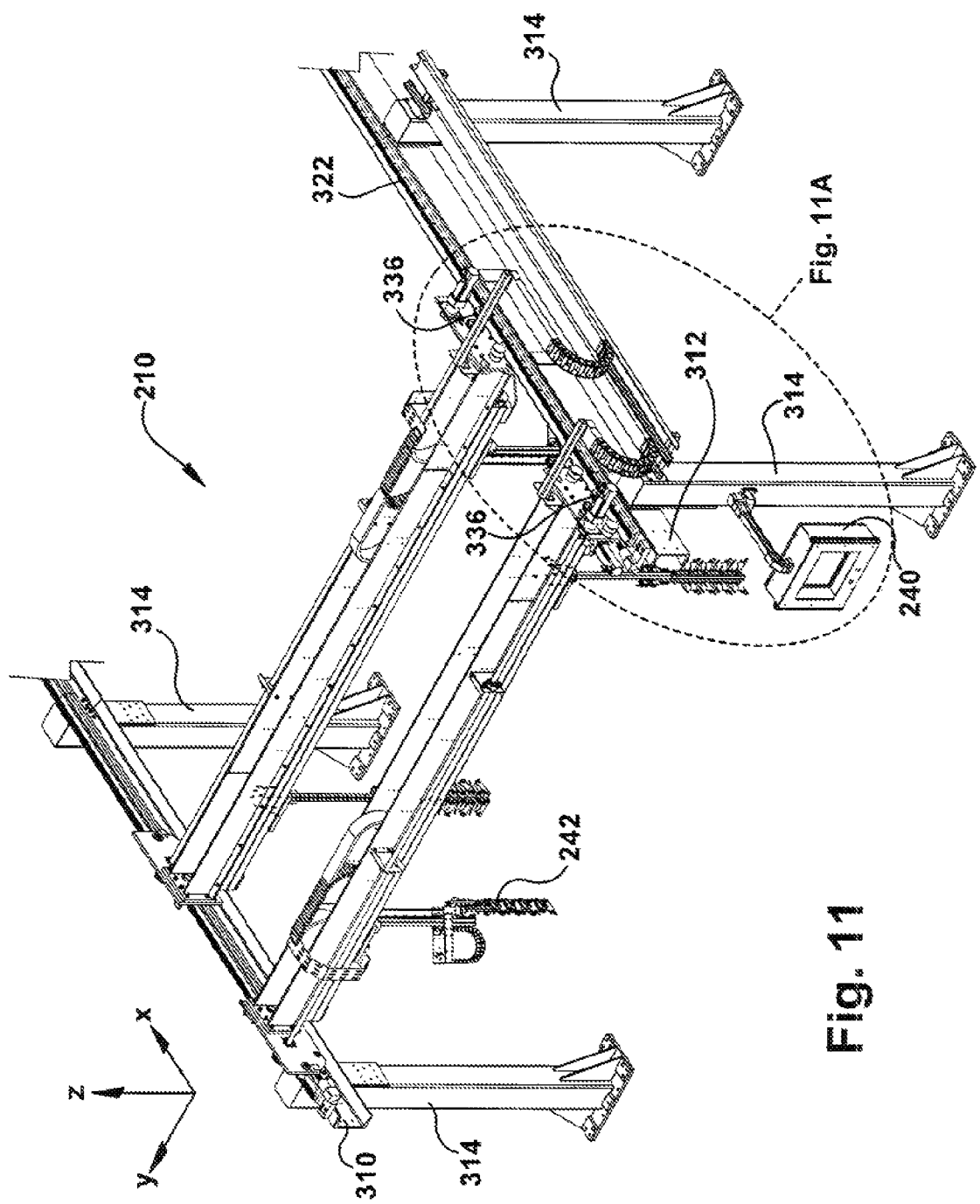

FIGS. 8 and 9 depict details of the four clamp or load tree 24 for clamping components 30 in alignment with other components that make up a door or window frame or sash. FIG. 9 is an enlarged elevation view of a loading tree and its clamp fixtures at the multiple levels in position near a fence 110 of the weld station with a fence 112 removed to depict the tree 24 in position for transfer of the components to the weld held. The weld head is an existing system that is commercially available from GED Integrated Solutions, assignee of the present invention. Each of the four support arms 40 is mounted for movement in the x-y plane toward and away from a clamping position for releasing engagement with the components once the components are delivered to the assembly station 100. As noted, the tree support a plurality of clamps at different levels 35a-35d.

Each clamp includes a base 120 that is stationary with respect to an arm 40. Each clamp also includes a pivoting finger 122 for trapping a component 30 placed on the base 120 between the base and pivoting finger for movement to the assembly station.

In the illustrated embodiment, each tree has two pivoting fingers and two stationary bases at each level to support orthogonally oriented components 30 are right angles with respect to each other. Each of the pivoting fingers of the tree is coupled to an associated one of two actuating rods 130, 132 (See FIG. 8) which is raised and lowered under the control of a controller (such as an air cylinder not shown) to clamp the components once they are in place resting on the their respective bases 120.

In the illustrated embodiment all four of the pivoting fingers 122 in a vertical array of the tree are pivoted to an open and a closed position in unison. It is possible that each of the fingers could be individually actuatable, however, so that a separate actuating rod is coupled to each of the pivoting fingers.

The arm 40 is raised and lowered by a ballscrew 140 which is coupled to the arm 40. The up and down movement of the arm 40 is guided by guide rods 142, 144 which move up and down and are attached to the arm 40 by a frame 134. At a top of the tree the rods 142, 144 pass through guides 150 that are attached to a carriage 160 mounted for movement to a cross beam by a rack and pinion drive (not shown).

Additional functionality can be added to this invention to use the overhead gantry or multiple gantries to retrieve the finished welded frames or sashes out of the welder, and transport them to a cleaning station for removing the flash from the welded area. In another configuration, it is possible to individually pivot the lower bases 120 with individual controls. All four corners of the lowest base 120 would pivot in unison to drop the lowest assembled frame or sash 10 into a cleaner or a conveyor. Afterwards, the next lowest frame or sash would drop and so on until the assembly fixture is emptied one at a time. As a method for increasing cycle times, a similar gantry would be staging and loading the welder. The invention is not limited to staging of vinyl windows or doors, but also composite, aluminum and wood windows and doors. This system can aid in the loading cycle of automatic fastening machines that can be nailing, gluing, and vibration welding in addition to the heat welding disclosed in the exemplary embodiment.

Alternate Embodiment

FIGS. 10-22 depict additional, details of an alternate preparation or set up station 210 for clamping components 30 in alignment with other components that make up a door or window frame or sash. Four moveable component supports 242, 244, 246, 248 each support a moveable tree assembly 212 (FIG. 12) for clamping window frame or sash components near the corners of those components.

Figure 12:
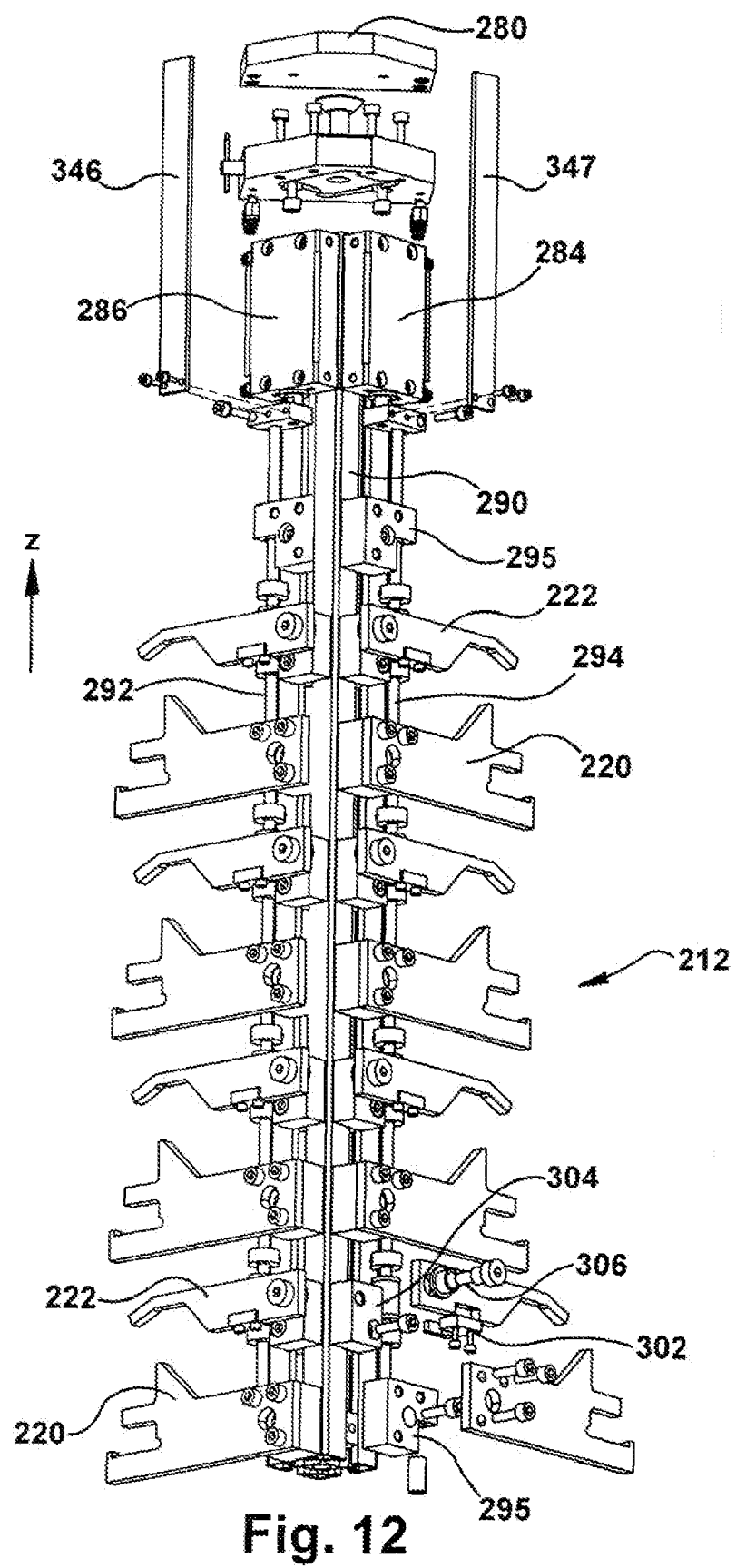
FIG. 12 is a perspective view of a window component support tree for use at the set up station.

FIG. 12 is an enlarged perspective view showing one of four load tree assemblies 212 and its clamp fixtures. The four tree assemblies 212 are mounted to their respective supports for movement up and down (z direction) and in an x-y plane toward and away from the setup station 210 for releasable engagement with the frame components 30 as the components are placed into a respective weld fixture at the weld station.

Each clamp fixture (four such fixtures are included in the exemplary embodiment) on the tree assembly includes a base 220 that remains stationary as the component is inserted into the fixture and a pivoting finger 222 for trapping a component 30 placed on the base 220 between the base and pivoting finger. Once all the components (up to sixteen in the exemplary embodiment) are clamped in place at the set up station, they are moved as a group to the weld station. In the illustrated embodiment, each tree assembly 212 has two pivoting fingers and two stationary bases at each of its four levels to support orthogonally oriented components 30 are right angles with respect to each other. Each of the pivoting fingers of the tree is coupled to an associated one of two actuating rods which is raised and lowered under the control of a controller 240 to initiate the clamping action after the components are placed onto their respective bases 220 by an operator. In the illustrated embodiment all four of the pivoting fingers 222 in a vertical array of the tree are pivoted to an open and a closed position in unison since they are all coupled to the same actuating rod. The exemplary controller 240 is includes a B&R Model X-20 programmable logic controller and personal computer. The PLC has interface connections for coupling the controller to the multiple servos and solenoids need to control movement of the four tree assemblies with respect to the set up and the weld stations and the personal computer controls display of a user interface for setup and operation of the apparatus.

Figure 20:
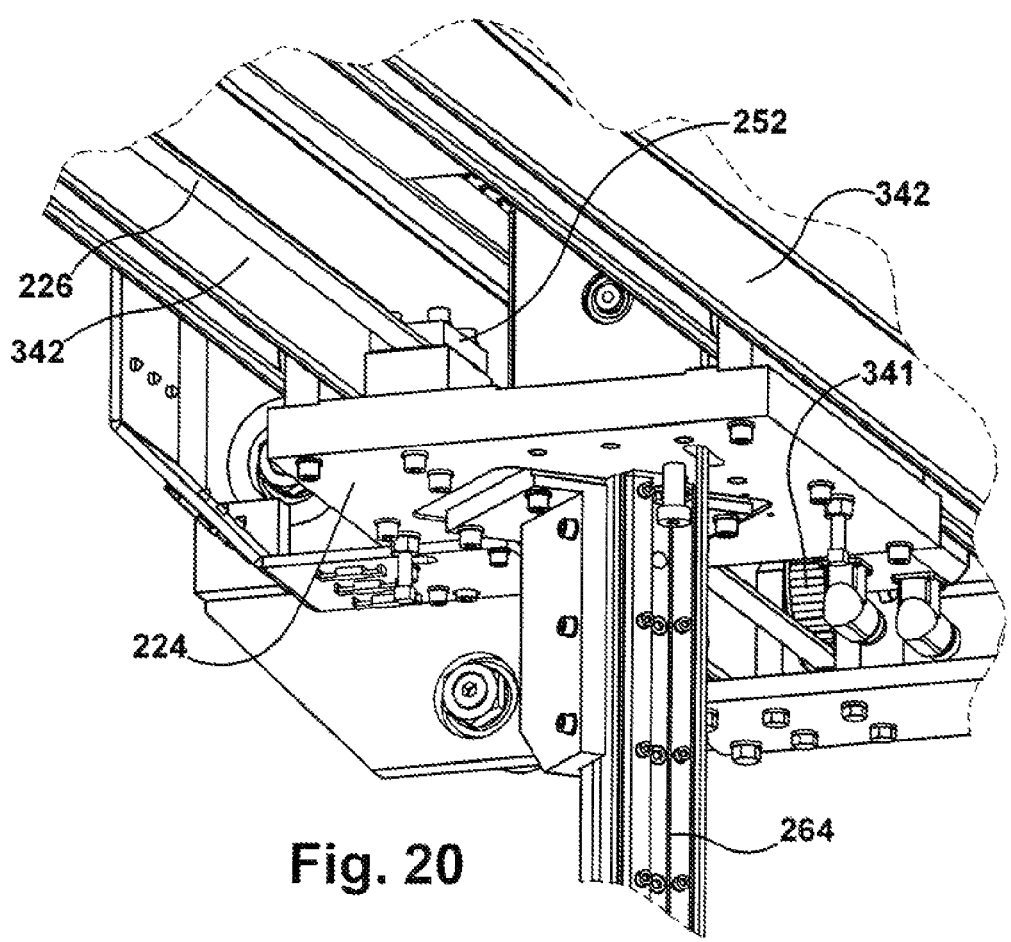
FIGS. 20 and 21 are perspective views showing an attachment of a tree support carriage to a drive belt for the carriages depicted therein.
Figure 21:
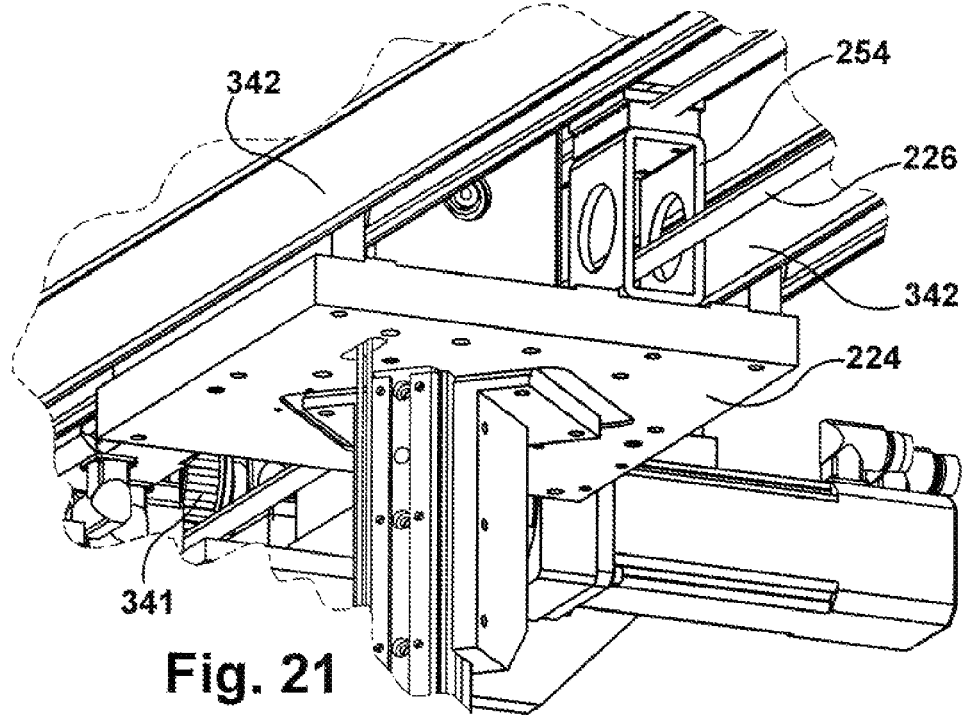

Each of the four tree assemblies are independently raised and lowered by the controller 240 in the z direction as defined by the drawings. Each set of fixtures made up of eight bases and their respective fingers that make up a tree is coupled to a support carriage 224 (FIG. 15) mounted for controlled movement in the y direction by a drive belt 226 (FIGS. 20 and 21). Movement in the x direction toward and away from an assembly station such as a weld station is controlled by one of two drives which move an associated one of two cross supports 230, 232. As in the earlier described embodiment, co-ordinated movements in three dimensions of four spaced apart tree assemblies 212 allow the components that make up multiple frames or sashes (in the exemplary embodiment four such components) to be positioned into pre-assembly alignment at the set up station 210 for subsequent movement to and assembly at the weld station.

The movable support carriage 224 supports a servo drive 250 that is actuated or energized by the controller 240 for raising and lowering an associated tree assembly coupled to the carriage. One of two different style carriage connectors 252, 254 (FIGS. 20 and 21) couples the support carriage 224 to a belt drive 226. Two carriages are supported by each of the cross supports 230, 232. Controlled movement of the belt drive moves two carriages coupled to a given belt drive in and out with respect to each other to bring their associated tree assemblies into proper relation for loading of window components.

An elongated guide or track 260 is connected to and extends downward from the support-carriage 224 to define an up and down travel path in the z direction. A support assembly 262 engages and is supported by the track 260 and is coupled by a cable 264 which extends through a slot in the carriage 224 to an output of the servo 250 for controlled up and down movement along the travel path defined by the track. A support plate 266 of the assembly 262 supports a number of magnets 270 (FIG. 16) having alternating north and south poles that face downward from the plate 266. Sensors 272, 274, 276 are positioned on the plate 266 to monitor operation of the clamping fixtures mounted to the trees and are described in more detail below.

The tree assembly 212 has a top plate 280 supporting multiple magnets 282 that attract the plate 280 to the support assembly 262 due to magnetic attraction between opposite poles of the sets of magnets 270, 282. Each tree assembly 212 has two air actuators 284, 286 coupled to an air supply (not shown) for selectively trapping and releasing window components brought info contact with the tree assembly. Each tree assembly 212 is coupled with four o-rings 287 (partially shown in FIG. 16) that act as face seals for air pressure to pass between the plates 266 and 280, and deliver air under pressure to the tree assembly 212. This facilitates quicker changeover times and reduces the risk of machine damage because the tree assembly can be decoupled without removing air lines. An elongated support 290 extends in the z direction a substantial length of the tree assembly 212. First and second sets of stationary window component bases 220 are fixed to the elongated support 290. At a given level of the tree assembly two bases extend at generally right angles with respect to each other away from the elongated support 290 and define support surfaces that engage adjacent elongated window components prior to clamping the window components to the tree assembly. Stated another way, during assembly, the operator rests the window component against the base 220 and then initiates clamping by means of a touch screen input 241 which interfaces with the controller 240 to actuate an air cylinder that clamps that component in place due to the pivoting action of as associated finger 222.

As noted, first and second sets of pivoting fingers 222 correspond in number to the number of stationary tree component bases 220. First and second actuator rods 292, 294 coupled to the air actuators 284, 286 operated by the controller 240 selectively pivoting the fingers 222 into engagement with the window components to trap a window component between a base 220 and its respective linger and release the components once they have been moved to and grasped by clamps at the weld station.

L shaped mounting blocks 295 are attached to the elongated support 290 by suitable connectors and include a throughpassage to accommodate up and down movement of the rods 292, 294 through the block. Threaded holes in the mounting blocks 295 accommodate connectors which pass through the relatively thin metal stamping of the base 220 to secure the base to its mounting block. When attached to the support 290 the eight bases 220 that make up the exemplary tree move up and down with the support 290 due to controller activation of the servo 250 attached to the carriage 224.

Compression springs 296 (schematically depicted as cylinders in the drawings) are supported by the rods 292, 294 in a region of two metal collars 298, 300 which control the extent of pivoting movement of the fingers 222. An up and down position of the collars with respect to the rod to which it attaches can be adjusted by loosening a set screw, adjusting the position of the collar and then tightening the screw. Like the bases 220, each of the fingers 222 is specially configured for a particular shape window component 30. Attached to the pivoting fingers 222 are actuators 302 having a U shaped slot into which an associated one of the two actuator rods extends. As the finger pivots, the U shaped slot allows pivoting movement of the finger without binding the rod.

Figure 13:
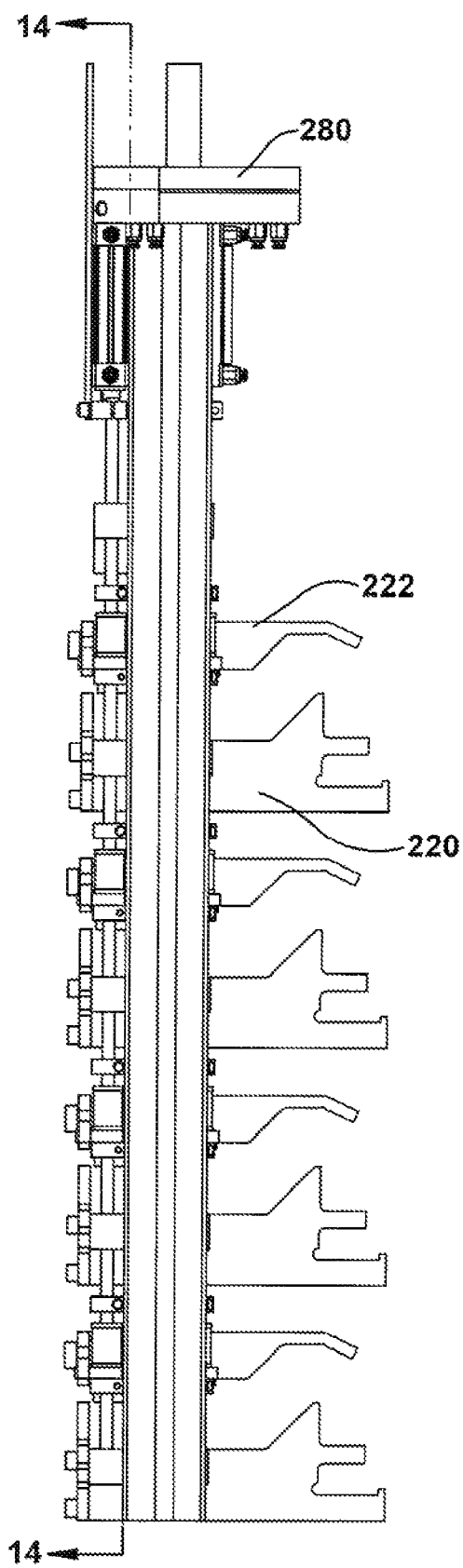
FIG. 13 is an elevation view of the tree depicted in FIG. 12.
Figure 14:
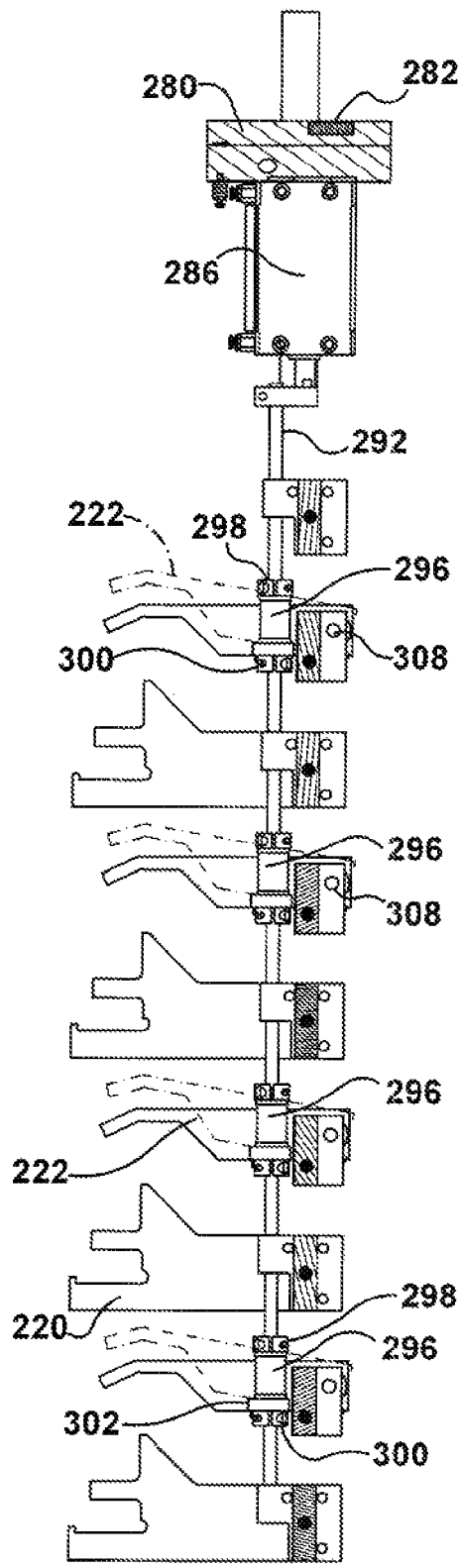
FIG. 14 is a view as seen from the plane 14-14 in FIG. 13.
Figure 15:
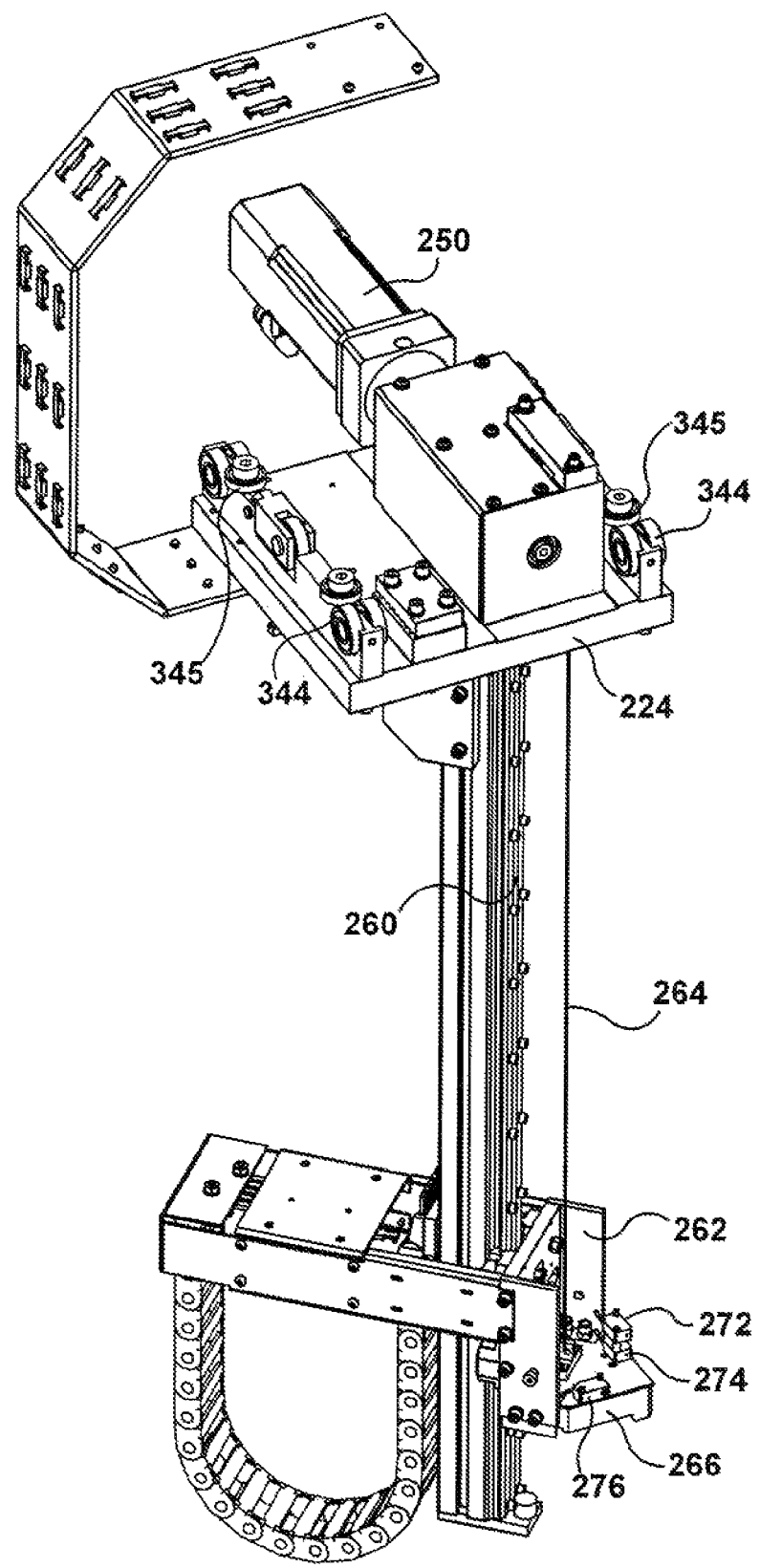
FIG. 15 is a perspective view of a tree support for supported the tree of FIG. 12 for up and down movement.
Figure 16:
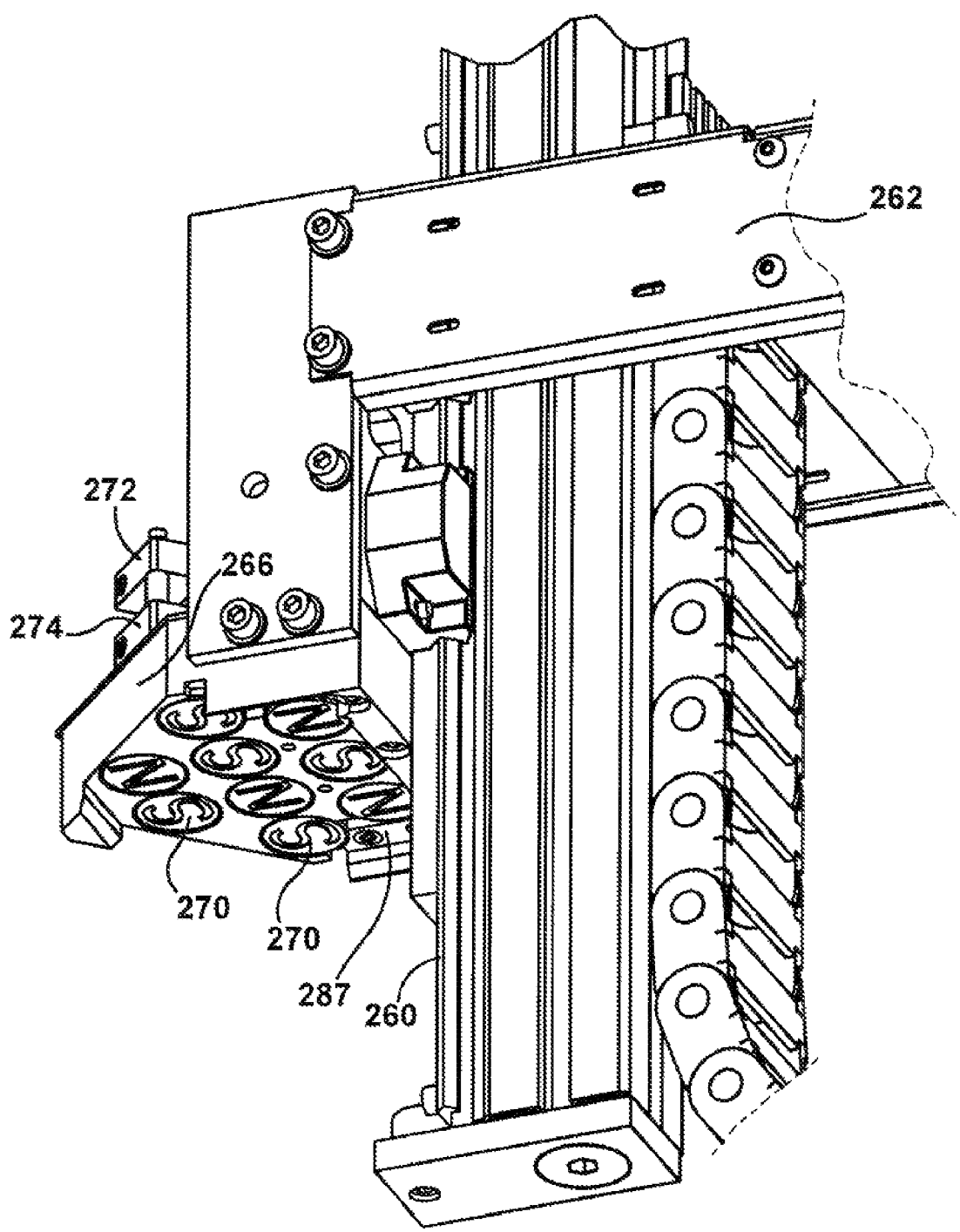
FIG. 16 is a perspective view of a bottom of the tree support of FIG. 15.
Figure 17:
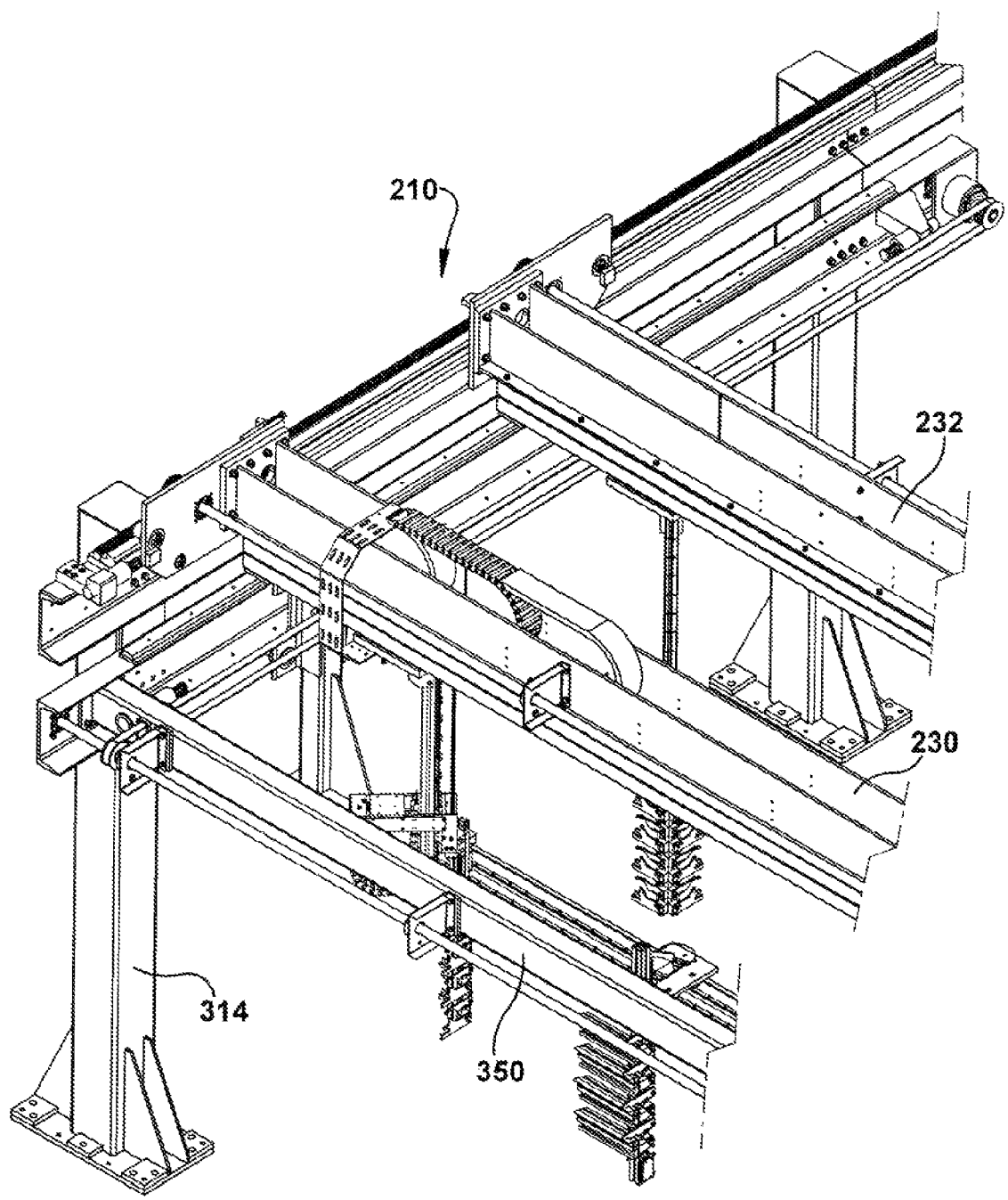
FIG. 17 is a perspective view of a set up station including a preload assembly.
Figure 22:
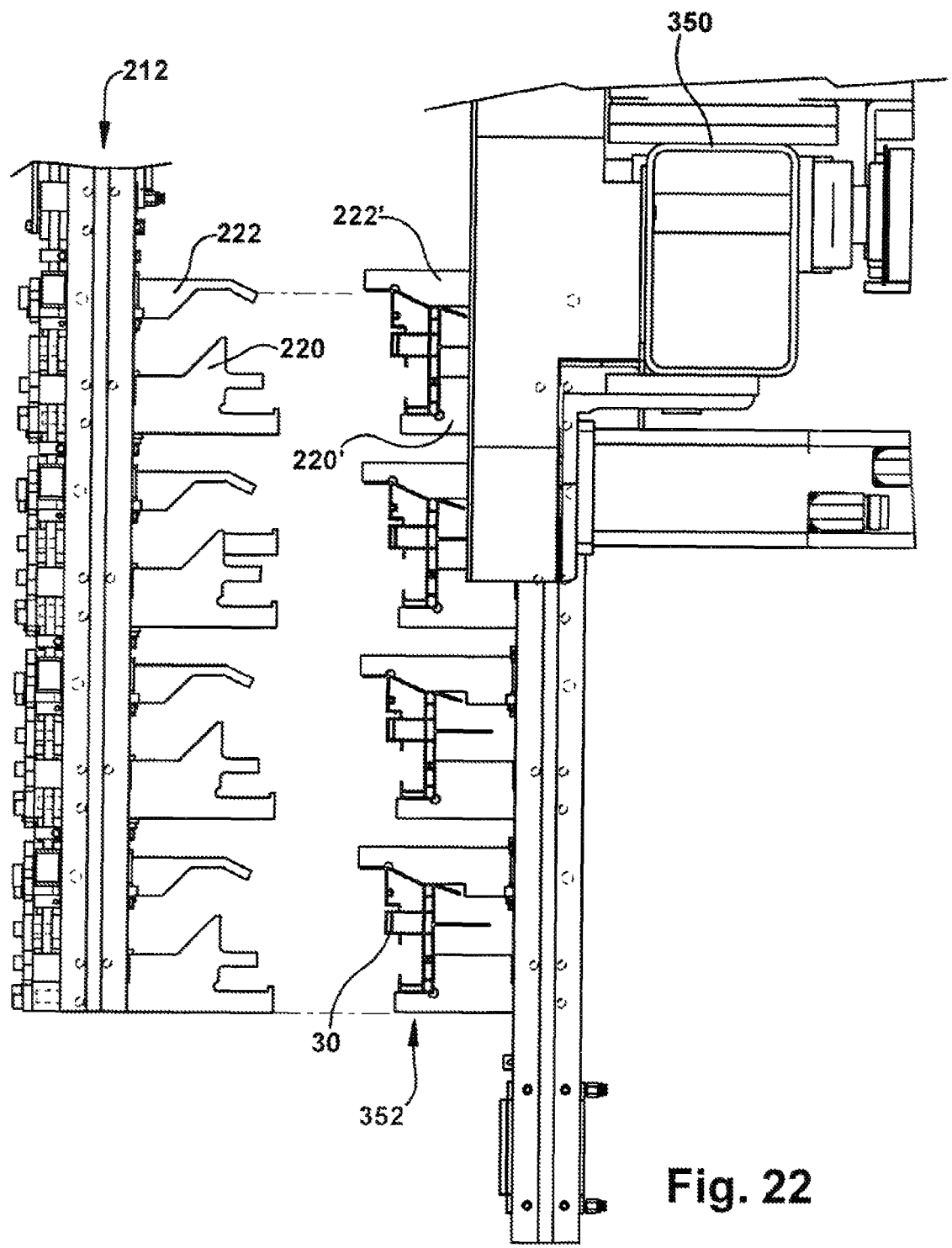
FIG. 22 is an elevation view showing a preload station that is optionally used in conjunction with the present invention.

In FIGS. 12-14, the fingers 222 are shown in their closed position in which they engage a frame component 30. The phantom position of the fingers in FIG. 14 shows the fingers in their open configuration due to movement of the rod upward as illustrated in the drawing. One typical frame component is shown in FIG. 22 and it seen that although the finger 222 is spaced from a top profile of its associated base 220 the finger engages the frame component in its closed position as the cylinder 286 pushes the actuator rod 292 downward as depicted in FIG. 14.

The fingers 222 are pivotally attached to blocks 304 which are in turn coupled to the elongated support 290. Connectors 306 pass through a bearing (not shown) supported by the finger to engage the block 304 along a pivoting axis 308 for the finger. A smooth surface of the connector supports the finger in the region of that finger's bearing. As seen most clearly in FIG. 14, when the fingers are in the closed position, the spring 296 associated with that finger is trapped between the upper collar 298 and the U-shaped actuator 302. The compressed spring produces a downward force on the finger so that a frame component is trapped in place between the base and its associated finger. Experience has indicated that the size of the components can vary slightly from one piece to the next. For this reason the fingers that make up the four levels of the tree assembly may contact the frame component at slightly different positions of the actuator rod travel. As the rod continues its downward movement, the spring associated with the first finger to contact a frame component will compress further until the rod is fully extended and all fingers biased by their associated springs to close without causing any component to be damaged.

The moveable component supports are coupled to a framework is positioned wife respect to the set up station 210 for moving frame or sash components 30 from the set up station to the weld station. The framework includes first and second elongated frame members 310, 312 raised above a floor by a plurality of uprights 314 which support the elongated frame members 310, 312 in spaced apart relation to each other bounding the set up and the weld stations.

First and second gear tracks 320, 322 extend along the elongated frame members from the set up station to the weld station. The two cross beams 230, 232 extend between the frame members and are supported by rollers 324, 325 which engage the elongated frame members to allow back and forth movement of the cross beams (and their associated tree assemblies) between the set up and weld stations. The rollers 324 engage generally flat portions of the member 310 and the rollers 325 are 'v'rollers that engage a 'v beam 326 mounted to the member 312. Individually actuatable first and second cross beam drives including a servo drive 334 having an output coupled through a transmission 335 to a drive shaft 337 that rotates gears 336 coupled to the gear tracks 320, 322 for moving an associated cross beam in the x direction. The drive shaft 337 extends from the side of the framework that supports the servo 334 across the width of the framework to an opposite side for driving a gear on an opposite side of the framework.

Each of the cross beams supports an additional servo drive 340 which is coupled through means of a transmission (not shown) for activating an endless loop belt drive 226 supported by drive pulleys 341 at the spaced apart ends of its associated cross member. When the servo 340 associated with the cross beam 230 is energized, the belt rotates and the supports 242, 244 move either toward each other or move away from each other an equal amount in the y direction. As seen in FIGS. 20 and 21 the carriages 224 of a respective support are mounted for movement to two cross I beams 342 which are connected to the cross member and carriage support rollers 344. (FIG. 15) The two I beams are sold under the designation uni-strut by Flex-strut hie of Warren Ohio, part number FS-151. Guide rollers 345 fit into a gap between side walls of the unistrut I-beams to guide the carriage in its movement along the extend of these I-beams.

The sensors mounted to the carriage monitor operation of the clamping rods as well as monitor the presence of the tree assemblies with respect to their carriages. Elongated metal targets 346, 347 are coupled to and move with the movement of the actuator rods. When the rods are moved upward, those extensions move in proximity to the sensors 272, 274, 276. The sensor 272 detects when the fingers are in an unclamped position. The sensor 274 detects if the tree assembly 212 is present or removed. The sensor 276 detects when the fingers are in a clamped position. The targets 346, 347 are mounted to the lower tree assembly 212 and facilitate quick removal of this assembly without the need to decouple electrical wires during changeover, and also will not be damaged if the lower tree assembly unexpectedly is separated from the machine.

Figure 18:
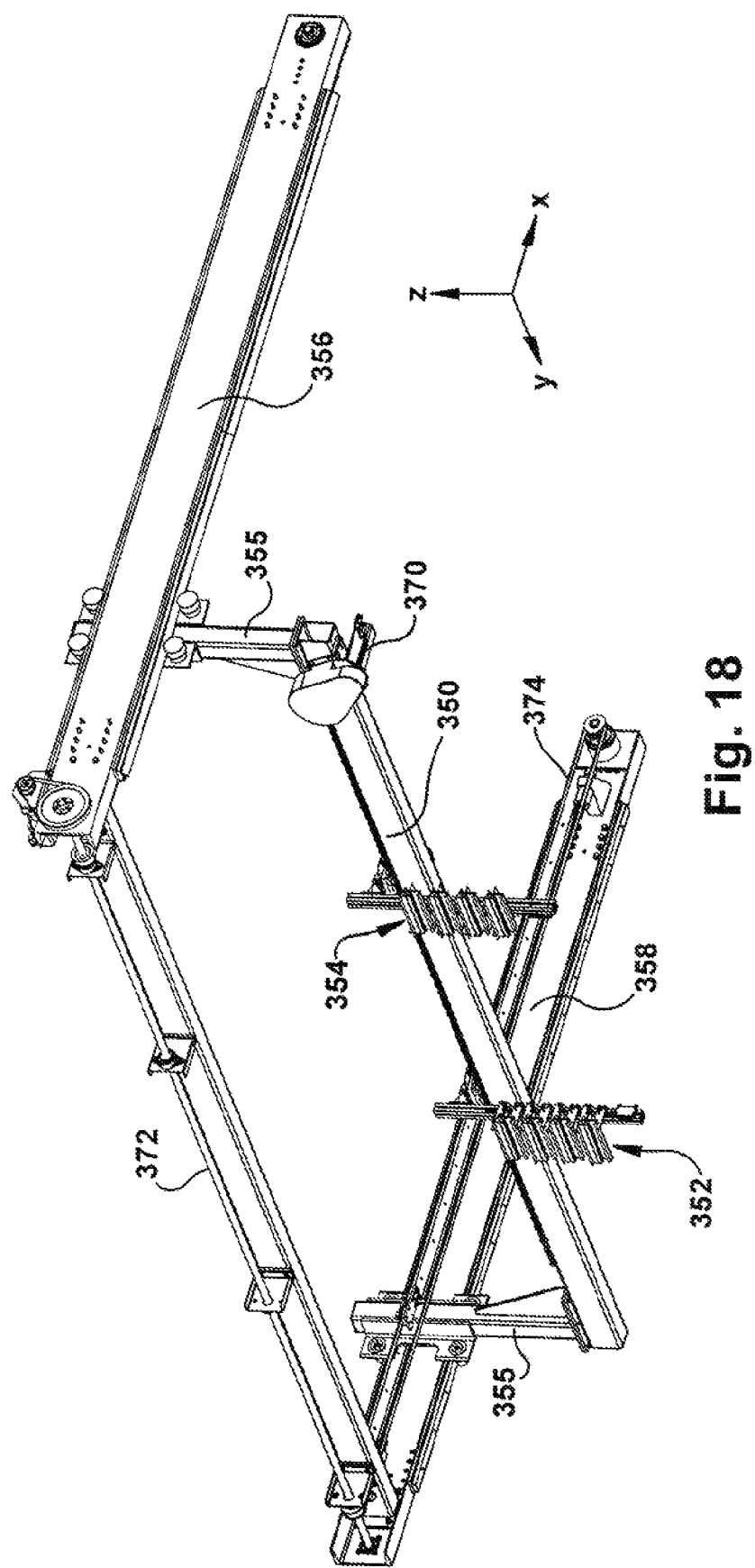
FIGS. 18 and 19 are perspective views of a preload assembly for use with the invention.
Figure 19:
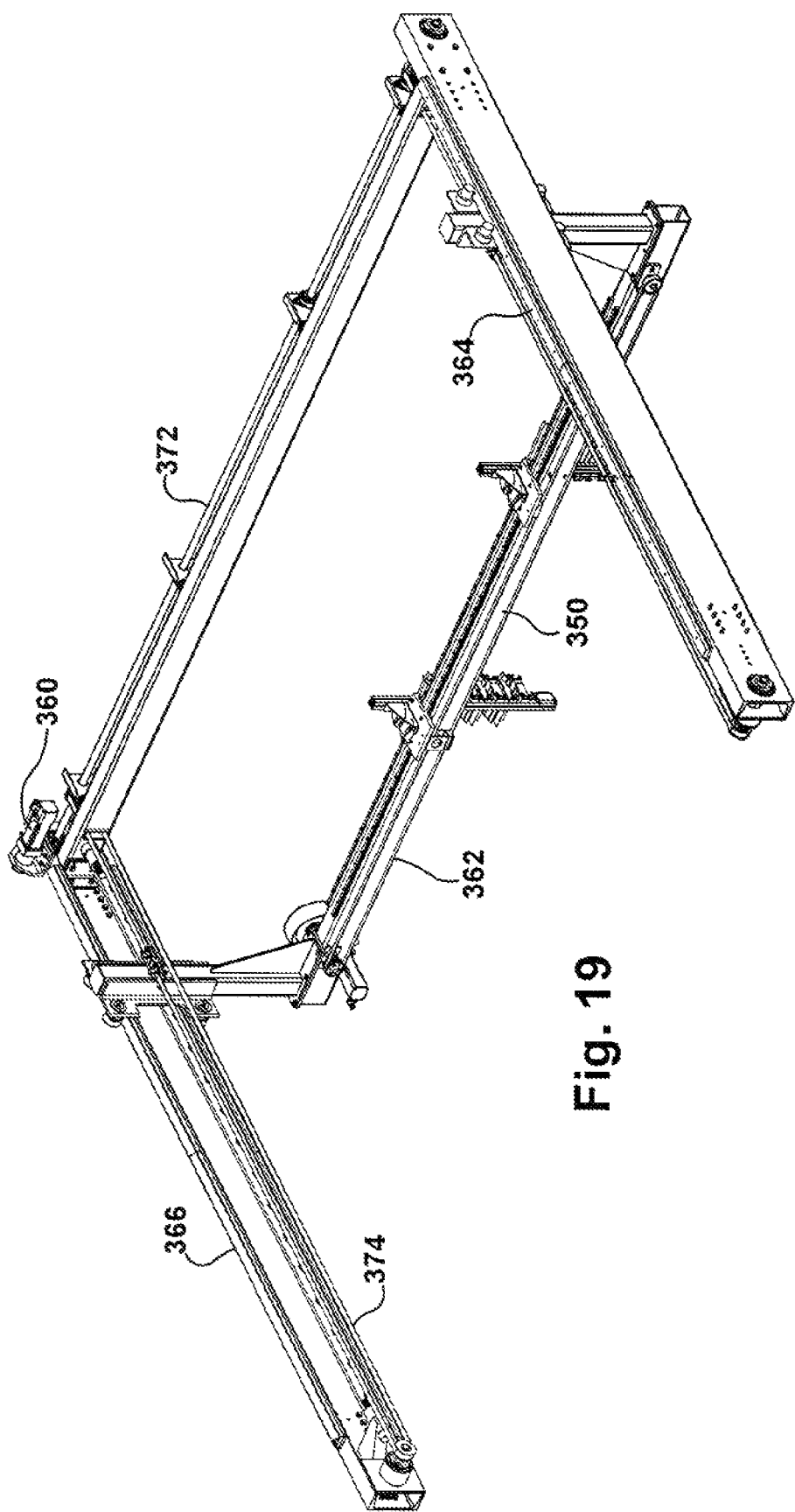

An optional pre-load staging system 350 is disclosed in FIGS. 18 and 19. This support 350 has first and second preload supports 352, 354 for presenting window components 30 that make up a back (side facing the weld station) of a frame or sash for transfer to the component supports 246, 248 carried by the cross beam 232 positioned closest to the weld station. The preload supports 352, 354 are carried at a fixed height by a cross beam 350. Two downwardly extending trollies 355 on opposite sides of the system 350 are supported by generally horizontally extending beams 356, 358 that are secured to the uprights 314 (See FIG. 17) and extend from the setup station to a parked station intermediate the set up and the weld stations. A drive 360 coupled to the controller selectively energizes two belts 374 with drive shaft 372 which moves the two trolleys along tracks 364, 366 that guide the trolleys in their movement in the x direction. Side to side movement of the two supports is achieved by a belt 362 coupled to a servo 370 in a manner similar to the belt which drives the other supports.

Assume the supports 242, 244, 246, 248 have delivered an aligned set of components to the weld station. The controller commands the drive 360 to move the preload supports 352, 354 to the set up station for loading components for a set of four frames components along a rearward facing edge or side of the frame.

After hand off at the weld station the empty tree assemblies are ready for re-loading. Once the supports 352, 354 are loaded with frame components, they are moved in the x direction toward the weld station. The two beams 230, 232 and their associated raised tree assemblies move past (over) the system 350. The beam 232 is stopped and its two tree assemblies lowered to face the components fixed in the preload supports as depicted in FIG. 22.

The preload assemblies 352, 354 are closer together than the assemblies 246, 248 awaiting receipt of the preloaded components oriented one above the other. This relative positioning (in the y direction) allows the assemblies 246, 248 to be spaced apart an appropriate amount for loading other frame components at the set up station. Stated another way the support trees grasping the components from the preload assemblies need to be spaced so that after when they are moved the setup station they are able to grasp in an appropriate spaced relation other side components placed into the assemblies by the operator.

The relative y spacing of the supports depicted in FIG. 22 allows the controller to move the beam 232 to move into position to gather the preloaded components from the preload support. The fingers 222' of the support are then opened to release the components from the bases 220' for movement to the setup station.

Use of the magnets 270, 282 and the o-ring 500 face sealing pneumatic couplings allows rapid interchange of different tree assemblies having different configuration fingers and bases. Also, the magnets allow the tree assembly to separate from its associated carnage in the even it inadvertently comes into contact with equipment or personel in the vicinity of either the weld station. To prevent damage to the tree assembly or a person, a tether (not shown) loosely couples the tree assembly to its associated carriage to allow disconnection of the two without allowing the tree assembly to fall to the floor. The proximity sensor 274 detects the disconnection of the tree assembly and the controller 240 immediately commands the machine to a stopped condition.

The controller 240 communicates with the various servos for moving the alignment fixtures relative to each other for staging and delivery of components to the weld station in repeating cycles. The controller 240 also includes an interface for presenting controls on the touch screen 241 that allow a user to move and clamp the window components as well as perform diagnostics and set up of the equipment.

While alternate preferred embodiments of the invention are described with a degree of particularity, it is the intent that the invention include all alterations and modifications from the disclosed embodiments falling within the spirit or scope of the appended claims.

We claim:

1. A method for use in assembling multiple window or door components to form a plurality of multi-sided window or door frames or sashes comprising:
    providing a plurality of support trees from which multiple pairs of base members and clamping fingers extend at spaced apart locations along a length of each support tree for supporting window or door components;
    attaching multiple support trees to a movable carriage and relatively positioning said support trees at junction locations to support adjacent window or door components of said frames or sashes in multiple offset planes that are separated by a spacing between the pairs of base members and clamping fingers;
    moving the carriage to a preparation station;
    with the clamping fingers in an open configuration, bringing sets of window or door components into alignment with each other in the multiple offset planes by bringing said window or door components into spanning contact with base members on two relatively positioned support trees;
    clamping the sets of window or door components in said multiple offset planes by moving the clamping fingers to a closed position to force the window or door components against the base members; and
    moving the multiple frames or sashes from the preparation station to an assembly station spaced from the preparation station as a group while maintaining the alignment of said window components for assembly at the assembly station by moving the carriage.

2. The method of claim 1 wherein the assembly station is a welding station and wherein window or door components are welded to form an assembled frame or sash.

3. The method of claim 1 wherein window or door components that form multiple frames or sashes are stacked one above the other at both the preparation station and the assembly station.

4. The method of claim 1 wherein the window or door components are plastic that are fused, bonded, screwed, glued, or vibration welded together at the assembly station.

5. The method of claim 1 wherein the support trees maintains the components in touching engagement as they are moved to the assembly station.

6. The method of claim 1 wherein the movement of said carriage from the preparation station to the assembly station is a rotation.

7. The method of claim 1 wherein the movement of said carriage from the preparation station to the assembly station is a translation.

8. The method of claim 1 wherein the offset planes are oriented in a general horizontal plane and further wherein the door or window components are moved up and down and wherein the carriage is mounted to a conveyor for movement to and from the assembly station.

9. The method of claim 8 wherein the assembly station comprises a welder having welding fixtures at four corners and further wherein the elongated trees are lowered from above into position and for delivery of the aligned door or window components.

10. The method of claim 1 wherein the carriage moves the components together to the assembly station and wherein the pairs of base members and clamping fingers engage an assembled window or door frame or sash and moves the assembled unit to a post processing station, such as a cleaning station.

11. The method of claim 10 wherein the carriage delivers multiple assembled window or door frames or sashes to the cleaning unit on different levels.

12. The method of claim 1 wherein the support trees comprise multiple clamping fingers for clamping door or window components in multiple planes that are individually independently actuated to release or clamp window or door components independent of clamping and releasing of window or door components at other planes.

13. The method of claim 1 wherein the base members and clamping fingers are of different types that are configured for a particular profile or cross section of window or door component and all pairs of base members and clamping fingers in a given plane are of the same type.

14. The method of claim 13 wherein all pairs of base members and clamping fingers of coupled to the trees are of the same type so all window or door components carried by the carriage a given time are of the same type.

15. A method for use in assembling multiple window or door components of a particular profile or cross section to form a plurality of multi-sided window or door frames or sashes having that particular profile or cross section comprising:
    providing sets of elongated support trees having multiple pairs of base members and clamping fingers spaced apart along a length of each support tree wherein engagement surfaces of said base member and clamping fingers are configured differently for supporting different profile window or door components;
    attaching multiple elongated component support trees for a given profile window or door component to a movable carriage at junction locations to support adjacent window or door components of said frames or sashes in multiple offset planes that are separated by a spacing between the pairs of bases and clamping fingers;
    moving the carriage to a preparation station;
    with the clamping fingers in an open configuration bringing window or door components into alignment with each other in the multiple offset planes by bringing said window or door components into contact with base members;
    clamping the sets of window or door components in said multiple offset planes by moving the clamping fingers to a closed position to force the window or door components against the base members; and
    moving the multiple frames or sashes from the preparation station to an assembly station spaced from the preparation station as a group while maintaining the alignment of said window components for assembly at the assembly station by moving the carriage.

* * * * *